(12) United States Patent
Tokuda

(10) Patent No.: US 9,001,339 B2
(45) Date of Patent: Apr. 7, 2015

(54) PRINTING APPARATUS, PRINTING SYSTEM, PRINTING CONTROL METHOD, AND STORAGE MEDIUM FOR REDUCING PRINT TIME AND MEMORY BY SENDING CONTROL DATA VIA NETWORK

(71) Applicant: Canon Kabushiki Kaisha, Tokyo (JP)

(72) Inventor: Akihiko Tokuda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 109 days.

(21) Appl. No.: 13/741,293

(22) Filed: Jan. 14, 2013

(65) Prior Publication Data

US 2013/0183120 A1 Jul. 18, 2013

(30) Foreign Application Priority Data

Jan. 16, 2012 (JP) ................. 2012-006451

(51) Int. Cl.
*G06F 15/00* (2006.01)
*G06F 3/12* (2006.01)
*G06K 1/00* (2006.01)
*G06K 15/02* (2006.01)
*B42B 9/00* (2006.01)

(52) U.S. Cl.
CPC . *G06K 15/02* (2013.01); *B42B 9/00* (2013.01); *G06K 15/1814* (2013.01); *G06F 3/1212* (2013.01); *G06F 3/122* (2013.01); *G06F 3/1267* (2013.01); *G06F 3/1288* (2013.01); *B42P 2261/04* (2013.01)

(58) Field of Classification Search
CPC ..... G06F 2/122; G06F 3/1267; G06F 3/1212; G06K 15/1814; G06K 15/02
USPC ................. 358/1.1, 1.15, 1.13, 1.14
See application file for complete search history.

(56) References Cited

U.S. PATENT DOCUMENTS

2007/0201363 A1\* 8/2007 Narukawa et al. ............ 370/230
2010/0153882 A1\* 6/2010 Nakagawa et al. ........... 715/838

FOREIGN PATENT DOCUMENTS

JP 2009-292047 A 12/2009

\* cited by examiner

*Primary Examiner* — Douglas Tran
(74) *Attorney, Agent, or Firm* — Canon USA, Inc., IP Division

(57) ABSTRACT

It is an object of the present invention to provide an information processing apparatus, a printing apparatus, a printing system, and a printing control method which can reduce a memory amount used in the printing apparatus and shorten a time required for printing. An information processing apparatus comprises a determination unit configured to determine whether a print mode is a print mode via a server capable of performing communication via a network, and a printing control unit configured to send print data including drawing data received from a pass-through application and divided in page units and control data regarding printing of the drawing data to the server device when the determination unit determines that the print mode is the print mode via the server, and to send the control data to a printing apparatus capable of performing communication via the network.

20 Claims, 22 Drawing Sheets

PRINTING APPARATUS, PRINTING SYSTEM, PRINTING CONTROL METHOD, AND STORAGE MEDIUM FOR REDUCING PRINT TIME AND MEMORY BY SENDING CONTROL DATA VIA NETWORK

BACKGROUND OF THE INVENTION

1. Field of the Invention

The present invention relates to an information processing apparatus, a printing apparatus, a printing system, a printing control method, and a program.

2. Description of the Related Art

Conventionally, a printing system includes a printer driver configured to receive a print instruction from an application installed in a client computer and to generate print data for a printing apparatus connected to a network with the client computer. In the printing system, there is an application, which can directly generate drawing data of a printer language of the printing apparatus without causing the printer driver to generate the print data, and send the print data via the printer driver. Hereinafter, the application is referred to as a pass-through application.

One of typical pass-through applications is Acrobat (registered trademark) produced by Adobe Systems Incorporated. The pass-through application such as Acrobat inquires whether the printer driver used for printing supports PostScript (hereinafter, PS) pass-through during printing execution to the printer driver. If the inquired printer driver supports the PS pass-through, the printer driver replies that the printer driver itself supports the PS pass-through to the application that has sent the inquiry.

When the application determines that the printer driver to be used for printing supports the PS pass-through, the application itself generates a PS command when printing, and sends the PS command to the printer designated as a port of the printer driver.

A PS pass-through application inquires whether the printer driver used for printing supports the PS pass-through to the printer driver using the following means. That is, in Windows (registered trademark), the PS pass-through application refers to setting of POSTSCRIPT_PASSTHROUGH of a printer escape function to determine whether the printer driver supports the PS pass-through.

On the other hand, when the printer driver replies that the printer driver does not support the PS pass-through, the PS pass-through application performs the following processing. That is, the PS pass-through application issues a generation command of the print data to the printer driver according to an OS standard drawing method defined on an operating system on the client computer.

A PS printer driver can also intentionally turn off POSTSCRIPT_PASSTHROUGH. In this case, the PS pass-through application issues a print command according to the OS standard drawing method. That is, the PS pass-through application has the same drawing method as that of the printer driver which does not support the PS pass-through (see Japanese Patent Application Laid-Open No. 2009-292047).

In the system configured to send the drawing data generated by the pass-through application described above, paper sheets to be printed are subjected to double-sided printing with a half of the paper sheet in size and the output paper sheets are bundled to finish the paper sheets into a book state is referred to as bookbinding printing.

A method for performing the bookbinding printing stores the print data output from the printer driver on the printing apparatus side for each page and performs imposition on the printing apparatus side (hereinafter, referred to as device bookbinding). In order to execute the device bookbinding, the total pages are rasterized into bit map data for each page before printing is started to be stored in a memory. After the total pages become clear, arrangement processing and print processing for imposition are to be performed. This disadvantageously requires a time until the printing is started and a time until the printing is ended.

A compact and saved memory type printer disadvantageously cannot store all the data for the total pages in the memory.

SUMMARY OF THE INVENTION

The present invention is directed to an information processing apparatus, a printing apparatus, a printing system, and a printing control method capable of reducing an amount of memory used by a printing apparatus and reducing time required for printing.

According to an aspect of the present invention, an information processing apparatus includes a determination unit configured to determine whether a print mode is a print mode via a server capable of performing communication via a network, and a printing control unit configured to send print data including drawing data received from a pass-through application and divided in page units and control data regarding printing of the drawing data to the server device when the determination unit determines that the print mode is the print mode via the server, and to send the control data to a printing apparatus capable of performing communication via the network.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

[System Configuration]

Figure 1:
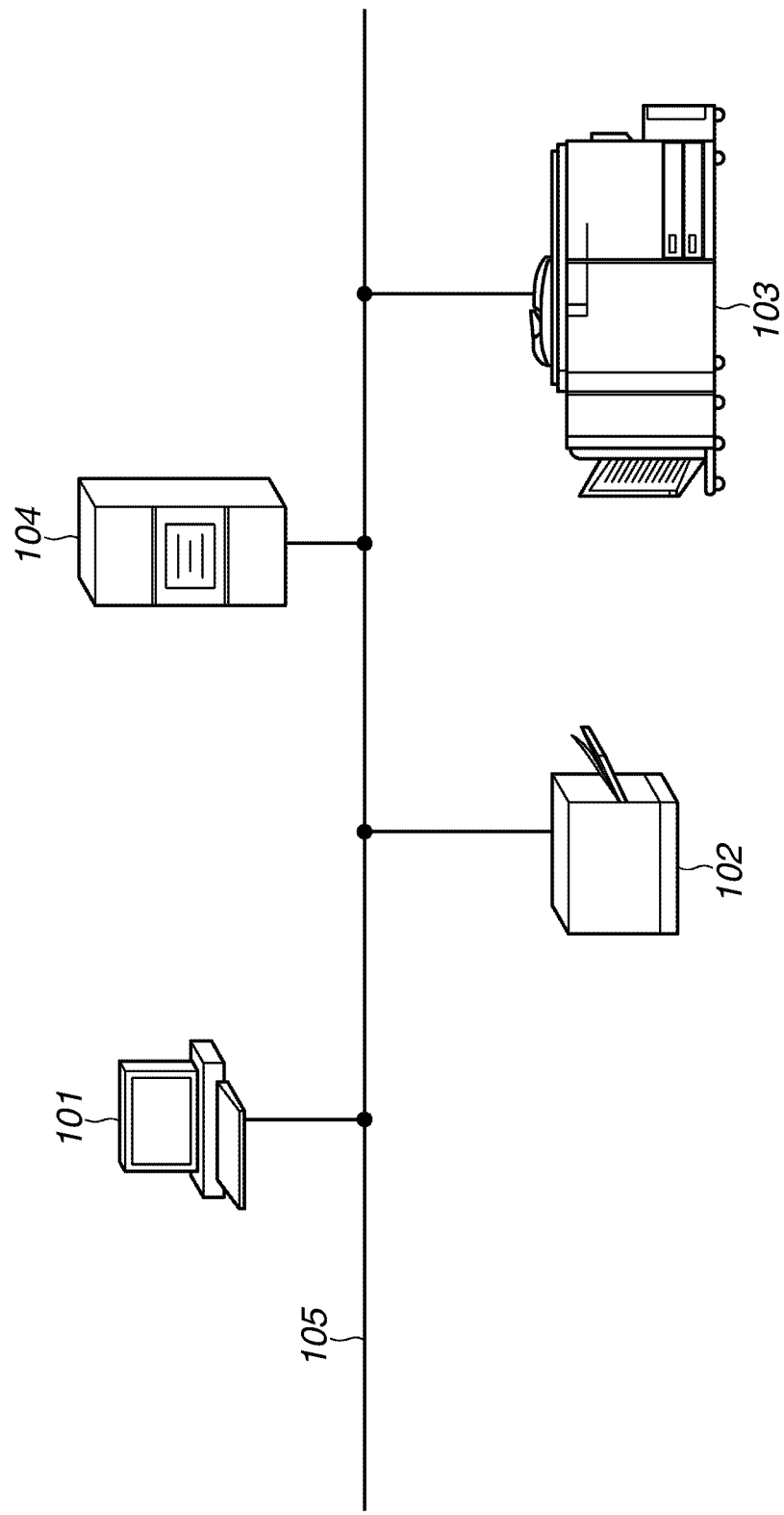
FIG. 1 illustrates an example of a system configuration of a printing system.

FIG. 1 illustrates an example of a system configuration of a printing system. A client computer 101, printing apparatuses 102 and 103, and a server 104 are connected to a network 105 so as to enable communication. The server 104 stores print data sent from the client computer 101.

An operating system (hereinafter, abbreviated as OS), an application, and a printer driver are installed in the client computer 101. With the system, a user can send data to the printing apparatus 102 or 103 from the client computer 101 to perform printing.

Alternatively, the user sends the print data to the server 104 from the client computer 101. The server 104 can send drawing data sent from the client computer 101 and stored to the printing apparatus in response to an acquisition request of the drawing data for each page from the printing apparatus 102 or 103, to perform printing. The client computer 101 is an example of an information processing apparatus.

[Hardware Configuration of Client Computer]

Figure 2:
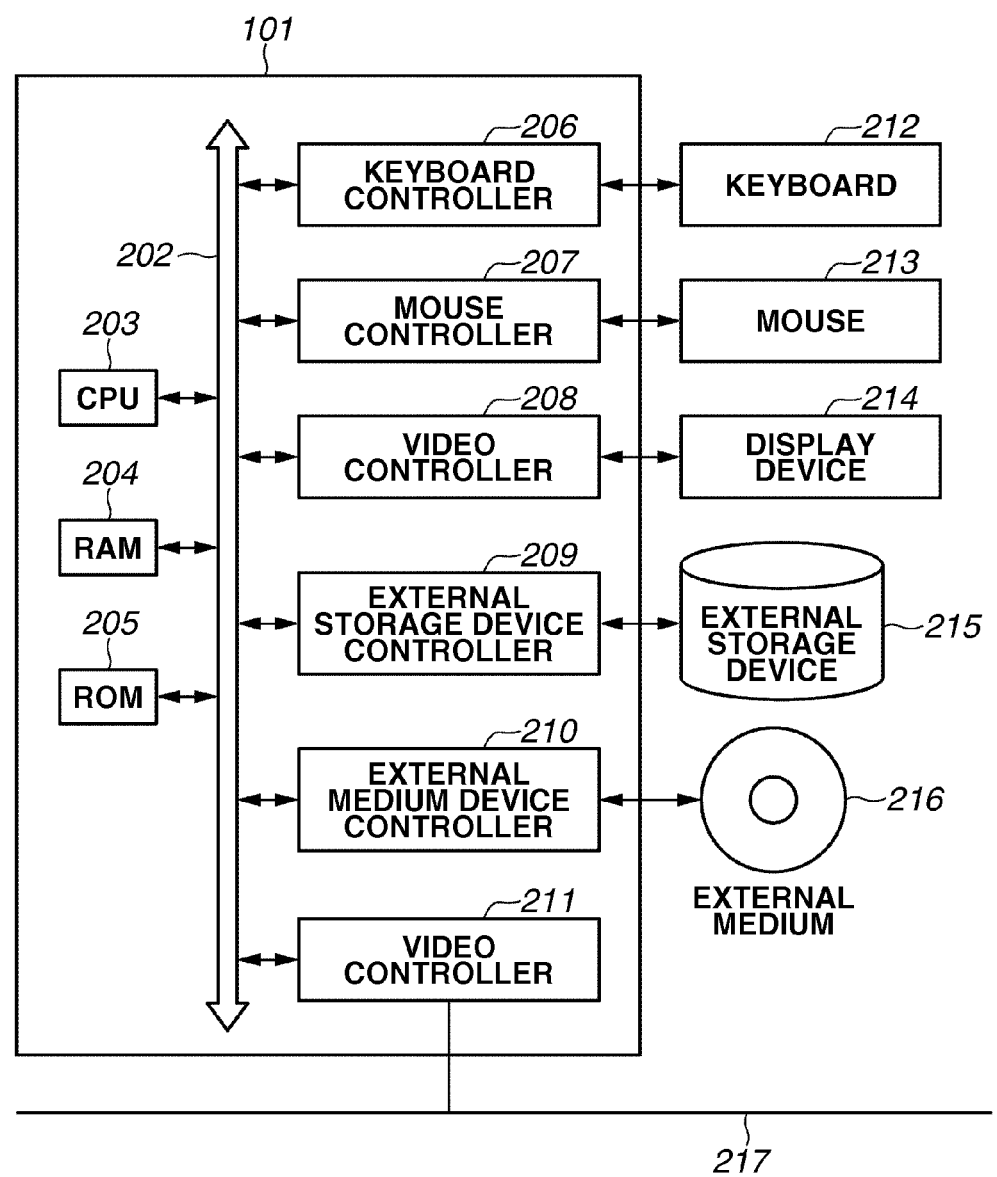
FIG. 2 is a block diagram illustrating an example of a hardware configuration of a client computer.

FIG. 2 illustrates an example of a hardware configuration of the client computer 101. The client computer 101 includes a central processing unit (CPU) 203, a random access memory (RAM) 204 as a volatile memory, a read-only memory (ROM) 205 as a nonvolatile memory, a keyboard controller 206, a mouse controller 207, and a video controller 208.

The client computer 101 further includes an external storage device controller 209, an external medium device controller 210, and a network I/F controller 211. A keyboard 212 and a mouse 213 used by the user to operate the client computer 101 are respectively connected to the keyboard controller 206 and the mouse controller 207 of the client computer 101.

A display device 214 is connected to the video controller 208 of the client computer 101. A nonvolatile external storage device 215 configured to store large volumes of data is connected to the external storage device controller 209 to write and read an application and data.

When the application and driver software are provided by external media (CD-ROM and DVD-ROM), the user can set an external medium 216 such as CD-ROM to the external medium device controller 210 to read a program.

The client computer 101 is connected to the network 105 described referring to FIG. 1 via the network I/F controller 211 to communicate with other apparatus.

An initial program for starting the client computer 101 and a fundamental program for controlling each module of the client computer 101 are stored in the ROM 205. The OS, the application, and the printer driver are stored in the external storage device 215.

When the client computer 101 is turned on, a program (boot loader) stored in the ROM 205 and for starting the client computer 101 is first read into the RAM 204, and is executed by the CPU 203. The CPU 203 loads the OS stored in the external storage device 215 into the RAM 204 based on the program.

The CPU 203 executes subsequent processing based on the OS. The CPU 203 further reads required modules and drivers into the RAM 204 from the external storage device 215 based on the OS. Furthermore, the CPU 203 reads a required application into the RAM 204 from the external storage device 215 according to a user's instruction and executes the application.

The printer driver and the installer of the printer driver described in the present exemplary embodiment are supplied by the external medium 216 such as a CD-ROM. When the external medium 216 is set to the external medium device controller 210, the CPU 203 reads the printer driver and the installer (program) of the printer driver into the RAM 204, and stores the printer driver and the installer of the printer driver in the external storage device 215, when needed.

The CPU 203 executes the program of the printer driver to realize a software configuration (module group) of the printer driver described below and processing according to a flow chart of the client computer 101 described below. In the present specification, the description may be given in such a manner that not the CPU 203 but the printer driver performs processing in order to simplify the description. Similarly, in the present specification, the description may be given in such a manner that not the CPU 203 but the application performs processing in order to simplify the description.

[Hardware Configuration of Printing Apparatus]

Figure 3:
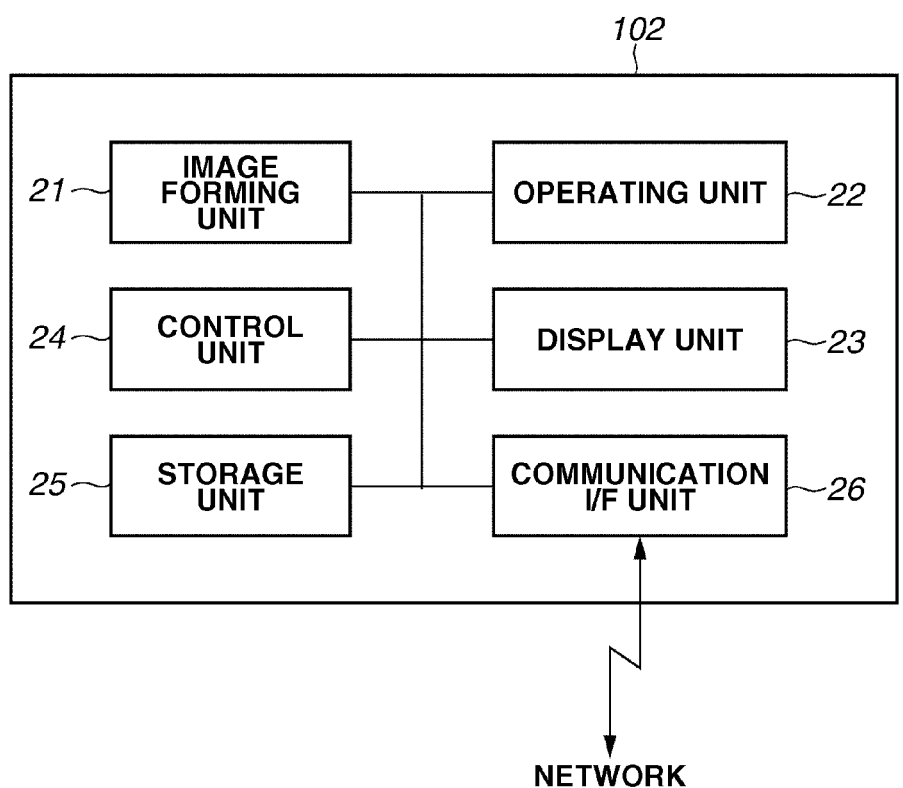
FIG. 3 is a block diagram illustrating an example of a hardware configuration of a printing apparatus.

FIG. 3 illustrates an example of a hardware configuration of the printing apparatus 102. An image forming unit 21 includes a part or all of a printing apparatus, a scanner, and a facsimile. An operating unit 22 includes an input device such as a hard key or a touch panel, and receives an operation of the image forming unit 21 and an operation of communication setting. A display unit 23 is an output device such as a display. The display unit 23 may be a touch panel integrated with the operating unit 22, and displays an operating state of the printing apparatus 102 and device setting.

When the image forming unit 21 detects a malfunction such as shortage of running stores and jam occurrence, a replacement procedure of the running stores and a part and a jam resolving procedure are displayed on the display unit 23. A control unit 24 performs the entire control of the printing apparatus 102 such as image formation control for controlling the image forming unit 21 and display control of the display unit 23 in response to an input from the operating unit 22.

A storage unit 25 includes a ROM and a RAM, and is used as a storage area for storing image data or device setting. A communication I/F unit 26 is a network interface connected to the network 105 to send state information to a managing device 110.

The control unit 24 executes processing based on a program stored in the storage unit 25 to realize processing according to a flow chart of the printing apparatus 102 described below.

The hardware configuration of the printing apparatus 103 is also similar to that of the printing apparatus 102. That is, a control unit of the printing apparatus 103 executes processing based on a program stored in a storage unit of the printing apparatus 103 to realize the processing of the printing apparatus 103. The storage capacity of the storage unit of the printing apparatus 103 is more than that of the storage unit 25 of the printing apparatus 102. The printing apparatus 103 has a plurality of paper feeding stages as illustrated in FIG. 1, for example.

[Hardware Configuration of Server]

Figure 4:
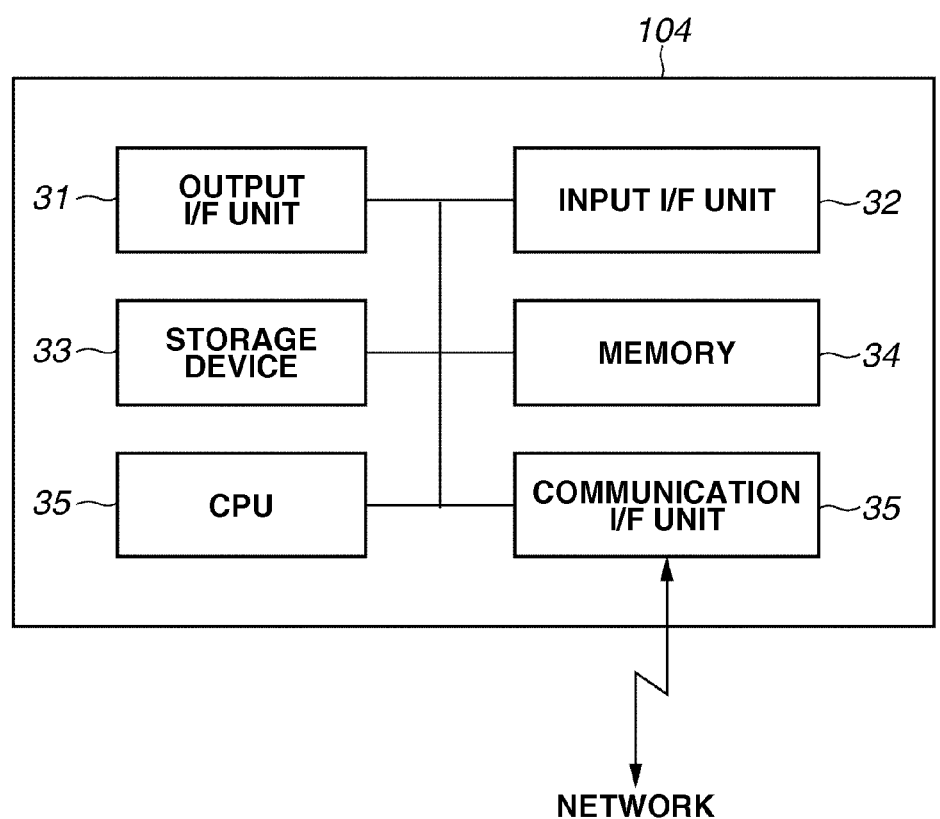
FIG. 4 is a block diagram illustrating an example of a hardware configuration of a server.

FIG. 4 illustrates an example of a hardware configuration of the server 104. The server 104 includes an output I/F unit 31 connected to an input device such as a display, an input I/F unit 32 connected to an output unit such as a keyboard, a storage device 33, a memory 34, a CPU 35, and a communication I/F unit 36. The print data and the program received from the OS and the client computer 101 are stored in the storage device 33.

The CPU 35 loads the program to the memory 34 from the storage device 33, and executes the program. The communication I/F unit 36 is connected to the network 105. The communication I/F unit 36 receives the print data from the client computer 101, and sends/receives information to/from the printing apparatus 102 or 103.

The CPU 35 executes the processing based on the program stored in the storage device 33 to realize a module configuration of a server application of the server 104 according to the present exemplary embodiment and processing according to a flow chart of the server 104 described below. In the present specification, the description may be given in such a manner that not the CPU 35 but the server application performs processing to simplify the description.

[Printer Driver Install]

Figure 5:
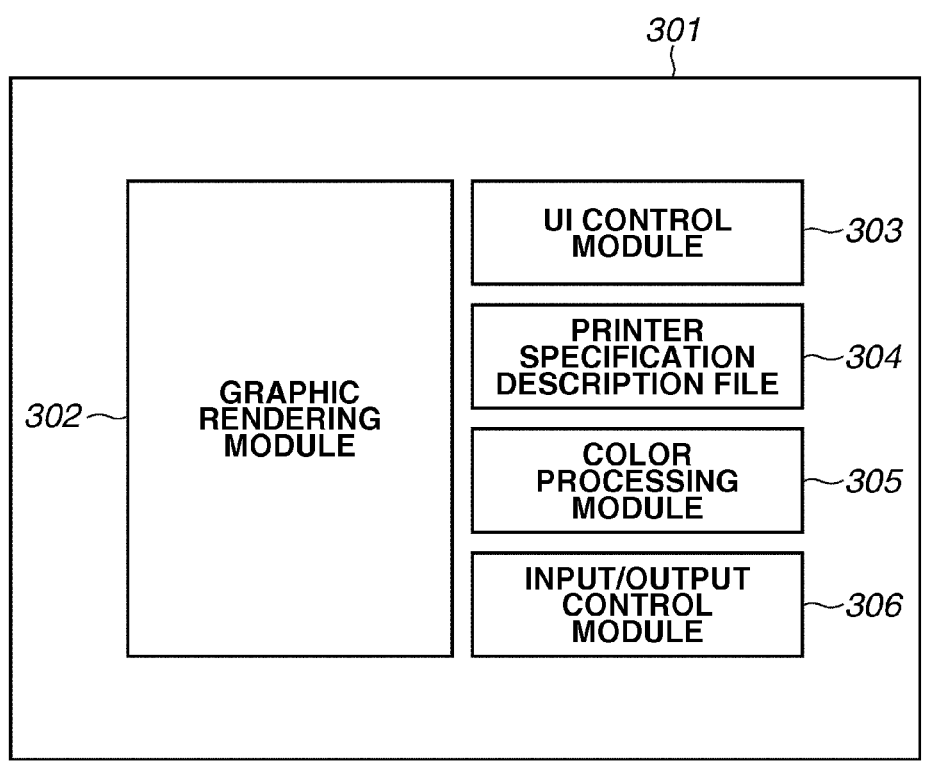
FIG. 5 is a block diagram illustrating an example of a module configuration of a printer driver.

Next, the printer driver will be described. FIG. 5 illustrates an example of a module configuration of the printer driver 301. The printer driver 301 includes a graphic rendering module 302, a UI control module 303, a printer specification description file 304, a color processing module 305, and an input/output control module 306. The printer driver 301 may include other modules depending on the function of the printer driver 301.

The printer driver has some preparing methods. For example, the graphic rendering module 302 and the UI control module 303 are configured so that the graphic rendering module 302 and the UI control module 303 can handle a plurality of printing apparatuses in order that one printer driver can support the plurality of printers.

As for the printer specification description file 4, the printer driver 301 includes printer specification description files for all the supporting printers. In the method, the UI control module 303 displays and controls UI according to the printer specification description file 304. The graphic rendering module 302 issues a page description language and a printer control command according to each printing apparatus.

Figure 6:
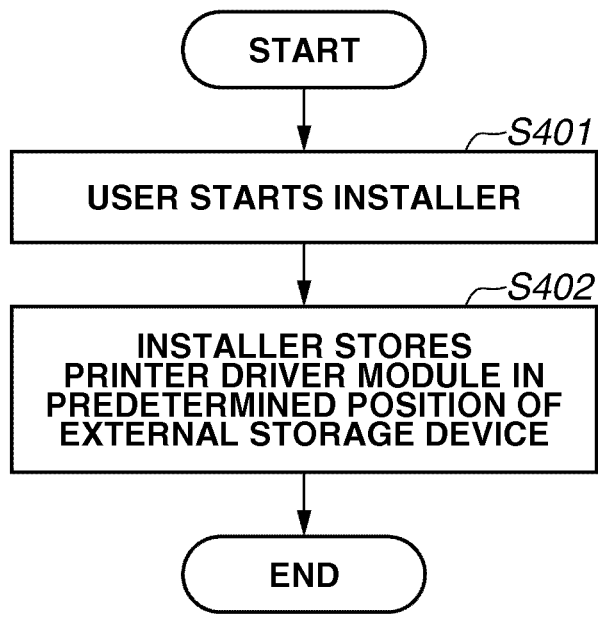
FIG. 6 is a flow chart illustrating an example of install processing of the printer driver.

Next, a procedure for installing the printer driver 301 having such a configuration into the client computer 101 will be described. FIG. 6 is a flow chart illustrating an example of install processing of the printer driver 301. The user prepares a CD-ROM storing the printer driver 301, or acquires a printer driver installer via the network 105.

In step S401, the CPU 203 starts the acquired printer driver installer based on a user operation.

In step S402, the CPU 203 stores a printer driver module in a predetermined position of the external storage device 215 based on the installer as a consequence of the operation. Although the storing position is different depending on the printing system, the printer driver module is stored in a directory equal to or below a directory such as ¥Windows¥system32¥spool¥drivers¥w32×86 in Windows7 as an example. Thus, the installation of the printer driver is completed.

[Method for Holding Printer Driver Setting Content]

The CPU 203 assigns initial setting information held in the printer driver 301 when the printer driver 301 is installed into all setting contents. These contents are registered into a storage unit referred to as the following registry and managed by the OS.

HKEY_CURRENT_USER¥SoftwareHKEY_LOCAL_MACHINE¥SOFTWARE¥HKEY_LOCAL_MACHINE ¥SYSTEM¥

[Server Application]

Figure 7:
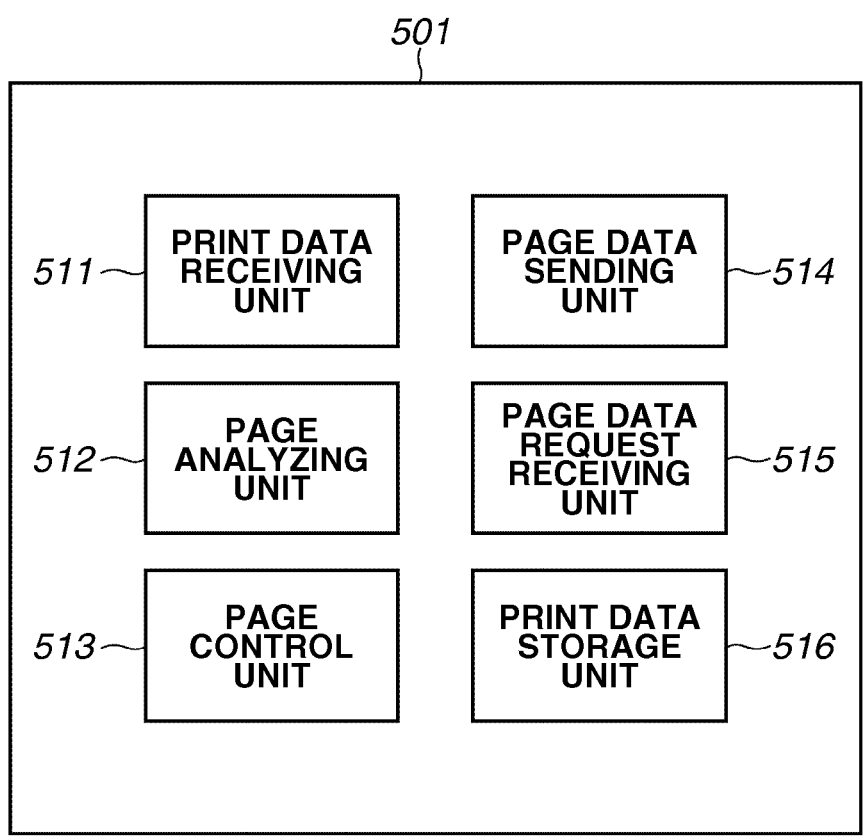
FIG. 7 is a block diagram illustrating an example of a function configuration of a server application installed in the server.

FIG. 7 illustrates an example of a function configuration of the server application installed in the server 104.

A print data receiving unit 511 receives the print data sent from the client computer 101. The received print data is once stored in a print data storage unit 516. A page analyzing unit 512 analyzes a control content regarding the appearance of a printed matter such as the total number of pages of the print data, stapling, punching, and bookbinding from the control data of the received print data.

A page control unit 513 controls a page according to the content analyzed by the page analyzing unit 512. A page data request receiving unit 515 receives a request to send the drawing data sent from the printing apparatus 102 or 103. The page analyzing unit 512 analyzes the content of the request to send the drawing data sent from the printing apparatus 102 or 103, and specifies the association of the print data designated by the sending request and the page order of page data (drawing data for each page) to be sent.

A page data sending unit 514 sequentially reads the page data analyzed and specified by the page analyzing unit 512 from the print data storage unit 516, and sends the page data to the printing apparatus 102 or 103.

[Flows of Drawing Data and Control Data]

Figure 8:
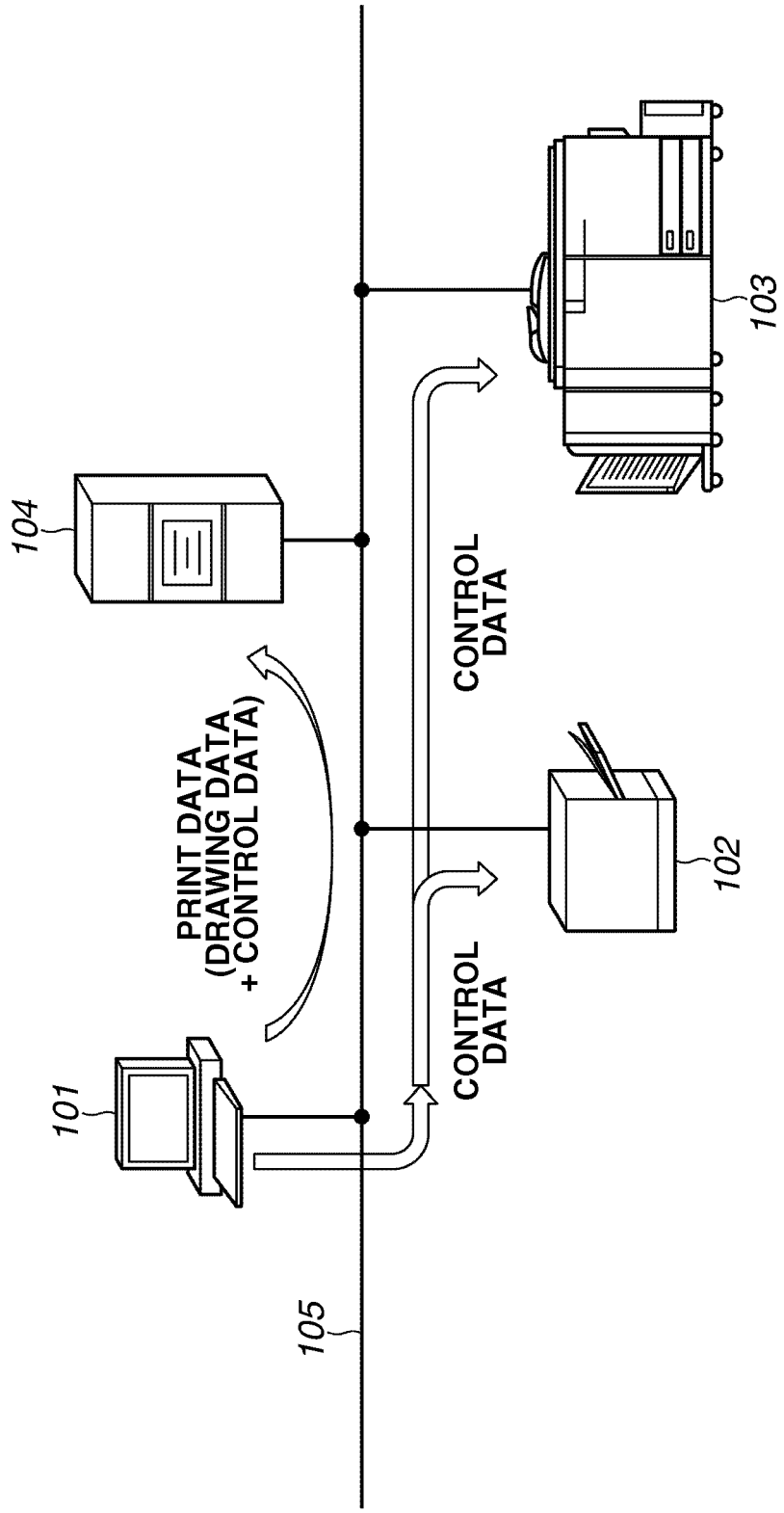
FIG. 8 illustrates flows of drawing data and control data for controlling printing according to a first exemplary embodiment.

FIG. 8 illustrates flows of the drawing data and the control data for controlling printing according to the present embodiment.

In the client computer 101, a document creation application, a draw system application, and a spreadsheet application are installed. When printing is executed from the application, a creation instruction to create the drawing data is issued to the printer driver previously installed in the client computer 101.

In this case, as described above, when the application supporting PS pass-through determines that the printer driver used for printing supports the PS pass-through, the application itself creates the drawing data described by PS. A PS printer driver performs the pass-through of the drawing data described by the PS.

More specifically, in the conventional pass-through, the printer driver sends the drawing data created by the application and described by the PS to a print port set as an output destination without processing the drawing data. The printer driver also generates control data for instructing staple processing, punching processing, and bookbinding processing in addition to the drawing data for representing a drawing expression, and causes the printing apparatus 102 or 103 to perform the processing. The printing apparatus 102 or 103 rasterizes the drawing data based on the description content of the drawing data described by the PS having performed the pass-through, and executes printing based on the control data.

In the present exemplary embodiment, the printer driver sends the drawing data to the server 104, and sends the control data to the server 104 and the printing apparatus 102 or 103. The server 104 receives the drawing data and control data sent from the client computer 101. The server application for managing specific information in the control data stores the information and the drawing data together.

The printing apparatus 102 or 103 interprets the control data sent from the client computer 101, and issues a request to send the page data to the server application according to the processing of the drawing data associated with the control data.

When the application determines that the printer driver used for printing does not support the PS pass-through, the application performs the following processing. That is, the application itself sends a standard drawing data format (GDI in Windows) of the OS without creating the drawing data described by the PS, and instructs the creation of the drawing data to the printer driver.

[Description of Bookbinding Printing in Conventional Example and Present Exemplary Embodiment]

Figure 9:
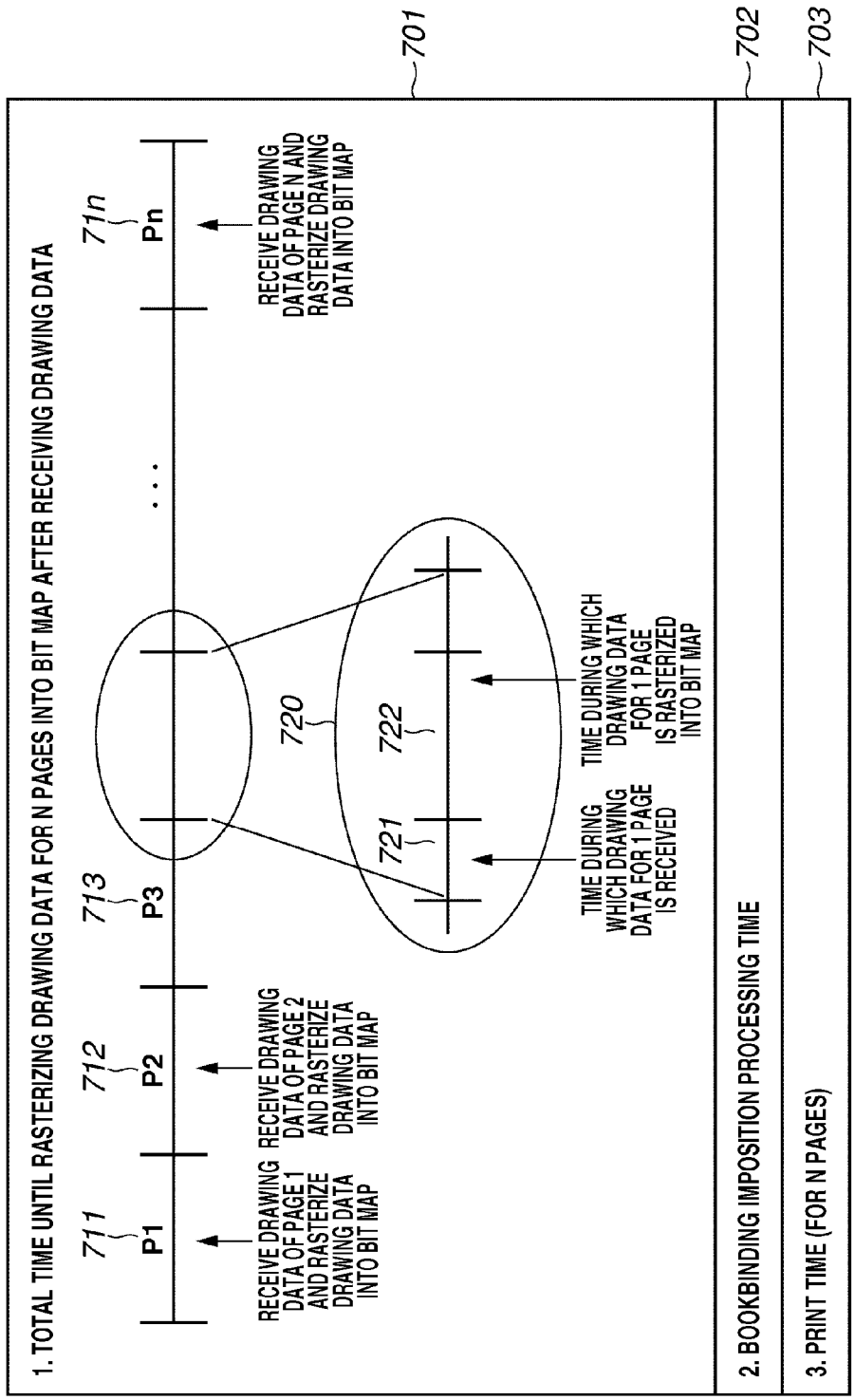
FIG. 9 illustrates a content of an operation in a printing apparatus in a conventional technique when bookbinding processing is performed on a device side.

FIG. 9 illustrates a content of an operation in the printing apparatus in a conventional technique when the bookbinding processing is performed on a device side.

The printing apparatus receives the drawing data of a first page to a last page ("$n^{th}$ page" in FIG. 9) for each page from the printer driver. The printing apparatus rasterizes the drawing data into data of a data format which can be processed by a printer engine such as a bit map, and once stores the data in a storage device such as a hard disk.

An operation 701 represents an operation until bit map rasterization is completed after the drawing data is received. Processing times 711 and 712 represent processing times for respective pages. A time 721 in an ellipse 720 represents a time during which the drawing data for one page is received. A time 722 represents a time during which the drawing data for one page is rasterized into drawing data.

When bookbinding printing is performed on the printer side, the first page, the $n^{th}$ page, the second page, and the $(n-1)^{th}$ page on the outmost paper of the product are printed in 2in1 double-sided printing (in the case where n is a multiple of 4). That is, the printing apparatus cannot start printing until the total number of pages (n) of the drawing data sent from the printer driver is known.

After the operation 701 is completed, bookbinding imposition processing of all the pages is executed in the printing apparatus (operation 702). The printing is sequentially executed from the outermost paper or the innermost paper (operation 703), and saddle-stitching and cutting processing (not illustrated) are finally executed.

Figure 10:
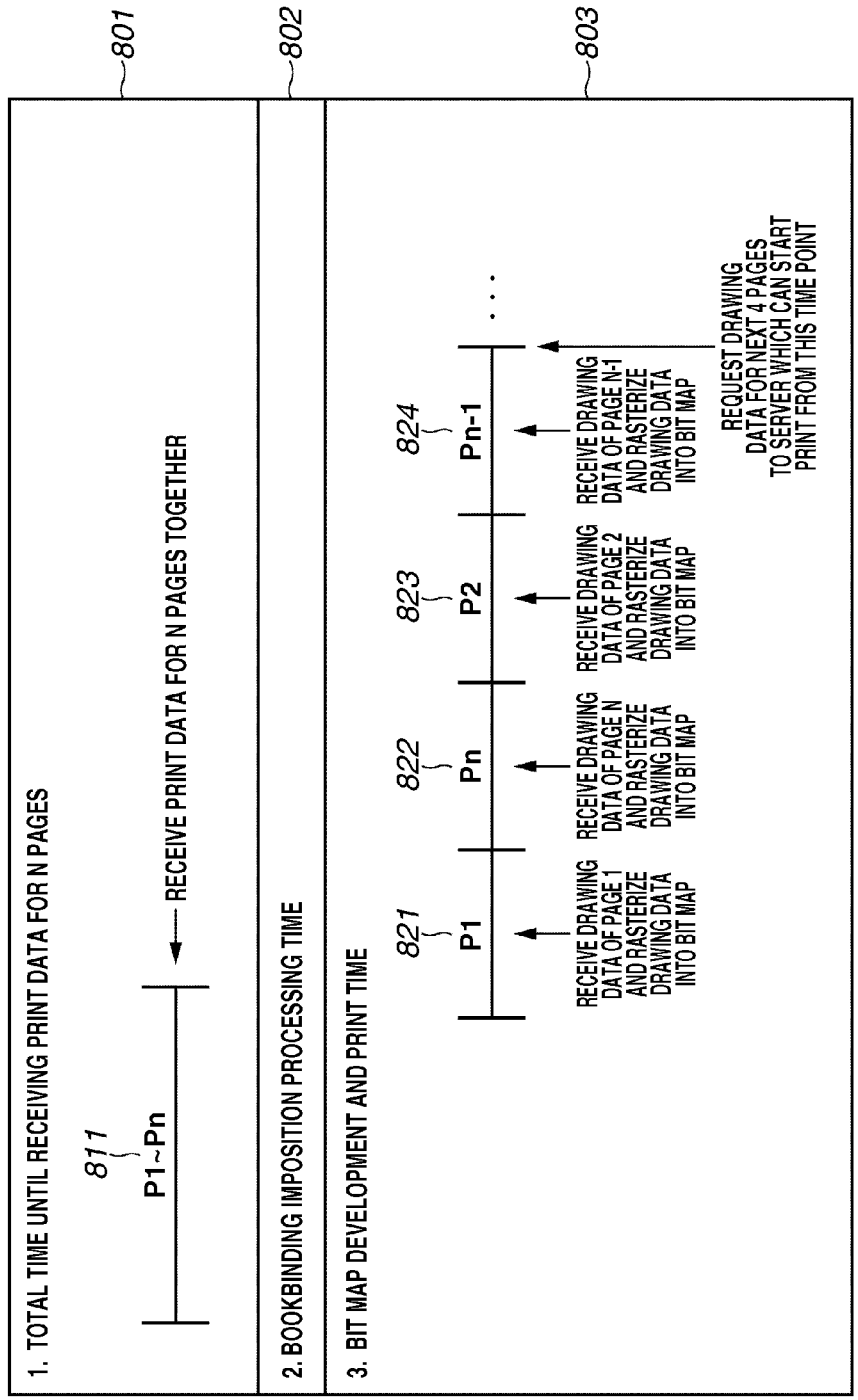
FIG. 10 illustrates a content of an operation of a printing apparatus according to the first exemplary embodiment when the bookbinding processing is performed on the device side.

On the other hand, FIG. 10 illustrates a content of an operation of the printing apparatus of the present exemplary embodiment when the bookbinding processing is performed on the device side.

When the printer driver receives the drawing data in packet units from a pass-through application, the printer driver divides the drawing data into drawing data for each page. The printer driver sends the print data including the drawing data and the control data generated based on the setting values to the server 104 (the server 104 receives in operation 801).

As described above, the printer driver sends only the control data to the printing apparatus at the same timing as that of the operation 801. A time 811 represents a time during which all the pages of the print data are received. In an operation 802, the printing apparatus analyzes the control data, and grasps information such as a size of a paper sheet used for printing and a processing method ("bookbinding printing" in the present exemplary embodiment).

Because the reception of the control data for all the pages from the printer driver is completed, the printing apparatus can grasp the total number of pages (n) at this time point. Because bit map processing in the printing apparatus is not yet conducted up to this time point, only a time during which the server receives the drawing data and the control data for all the pages and a time during which the printing apparatus receives the control data are taken.

The printing apparatus executes the bookbinding imposition processing for bookbinding. In an operation 803, the printing apparatus sends a request to send the drawing data for the outermost paper or the innermost paper, that is, four pages to the server 104. After reception, the printing apparatus can rasterize the drawing data for only four pages into a bit map, and execute the print processing.

The printing apparatus requests the drawing data for the next four pages to the server 104, receives the drawing data, and repeats printing at a time point when the printing apparatus is set into the print operation. Thus, the start timing of the initial printing is earlier than that of the conventional technique. In addition, since the printing apparatus can receive the next drawing data in parallel during the execution of the print operation, the operation efficiency of the printing apparatus can be also enhanced.

FIG. 10 includes a first page 821, an $n^{th}$ page 822, a second page 823, and an $(n-1)^{th}$ page 824.

Figure 11:
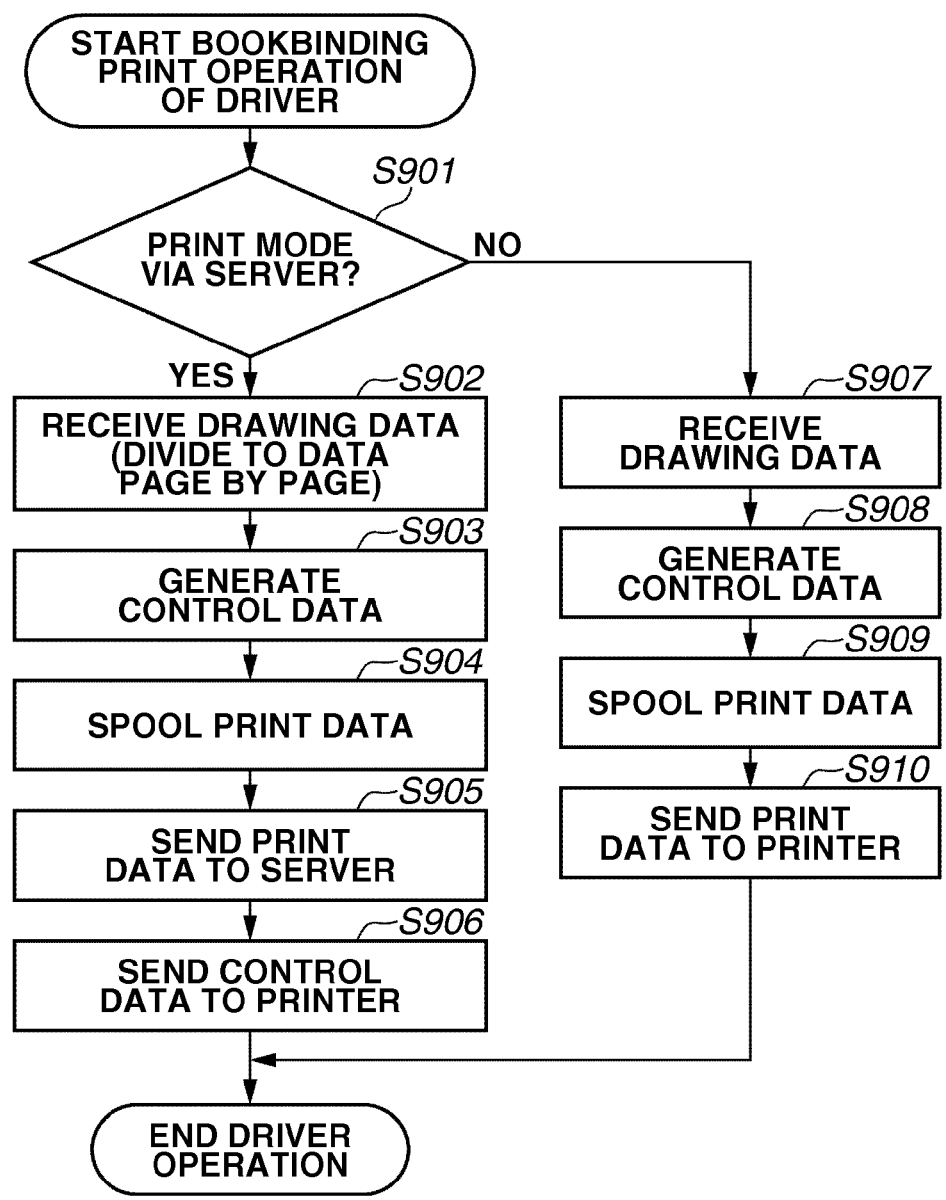
FIG. 11 is a flow chart illustrating an example of printing control processing of a printer driver according to the first exemplary embodiment.

FIG. 11 is a flow chart illustrating an example of printing control processing of the printer driver according to the present exemplary embodiment.

Figure 17:
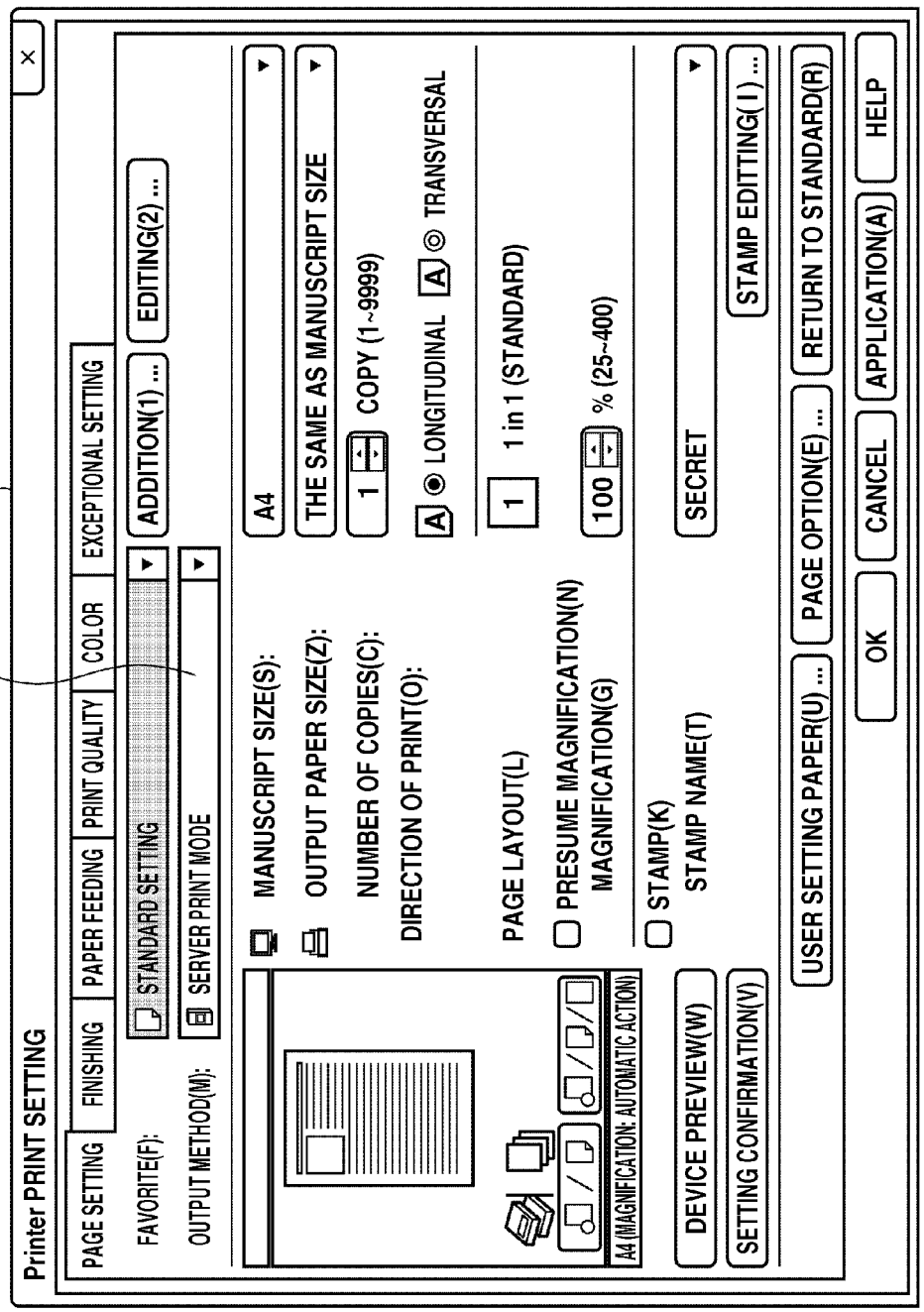
FIG. 17 illustrates an example of a print setting screen displayed by the printer driver according to the first exemplary embodiment.

The user can select "a general print mode" directly sending the print data to the printing apparatus or "a print mode via a server" sending the drawing data to the server 104 connected to the network 105 according to the present exemplary embodiment, as illustrated in FIG. 17 described below. In step S901, the printer driver determines whether the mode is "the general print mode" or "the print mode via a server" based on user's selection via a print setting screen.

In the case of "the print mode via a server" (YES in step S901), then in step S902, the printer driver receives the drawing data in packet units created by the pass-through application, and generates the drawing data (hereinafter, also referred to as page data) for each page. The page analyzing unit 512 of a server application 501 can analyze the drawing data for each page.

In step S903, the printer driver generates the control data for controlling the drawing data based on the setting value.

In step S904, the printer driver spools the print data including the created drawing data and control data to a spooler.

In step S905, the printer driver sends the spooled print data to the server 104.

In step S906, the printer driver sends the created control data to the printing apparatus 102 or 103.

On the other hand, when "the general print mode" is selected in step S901, then in step S907, the printer driver receives the drawing data prepared by the pass-through application as usual.

In step S908, the printer driver generates the control data for controlling the drawing data based on the setting value.

In step S909, the printer driver spools the print data including the received drawing data and the control data to the spooler.

In step S910, the printer driver sends the spooled print data to the printing apparatus 102 or 103.

Figure 12:
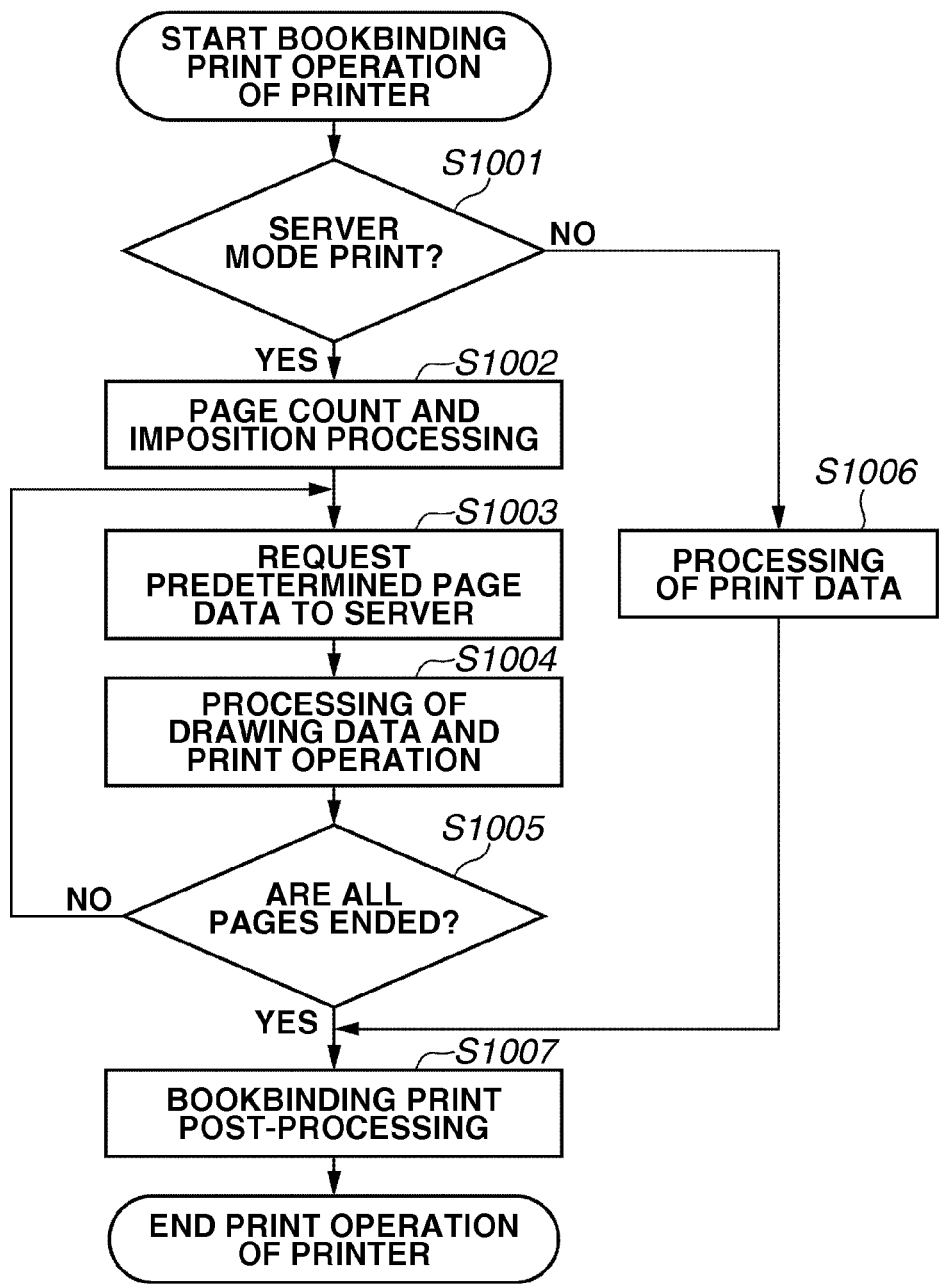
FIG. 12 is a flow chart illustrating an example of printing control processing of a printing apparatus according to the first exemplary embodiment.

FIG. 12 is a flow chart illustrating an example of printing control processing of the printing apparatus according to the present exemplary embodiment. Hereinafter, description will be given using the printing apparatus 102 as an example of the printing apparatus.

In step S1001, the printing apparatus 102 determines whether the data sent from the client computer 101 is "the general print mode" or "the print mode via a server" based on the control data. When the printing apparatus 102 determines that the data is "the print mode via a server" (YES in step S1001), the processing proceeds to step S1002. When the printing apparatus 102 determines that the data is "the general print mode" (NO in step S1001), the processing proceeds to step S1006.

In step S1002, the printing apparatus 102 reads a control data portion (only the control data in the present exemplary embodiment) from the data. After the printing apparatus 102 receives all the control data, the printing apparatus 102 performs imposition processing from the total number of pages (page count in FIG. 12) and information of a processing method.

After the printing apparatus 102 ends the imposition processing, in step S1003, the printing apparatus 102 notifies a request to cause the server 104 to send the page data required for the first printing.

In step S1004, the printing apparatus 102 sequentially receives the required page data, rasterizes the page data into the drawing data, and executes printing.

In step S1005, the printing apparatus 102 determines whether print processing of all the pages is completed. When the print processing is not ended (NO in step S1005), the printing apparatus 102 repeats the processing of steps 1003 to 1005.

On the other hand, in step S1006, the printing apparatus 102 performs processing of the print data of the conventional bookbinding printing as illustrated in FIG. 9.

In step S1007, the printing apparatus 102 performs saddle-stitching and cutting processing after completing all the printings, and completes the print operation.

Figure 13:
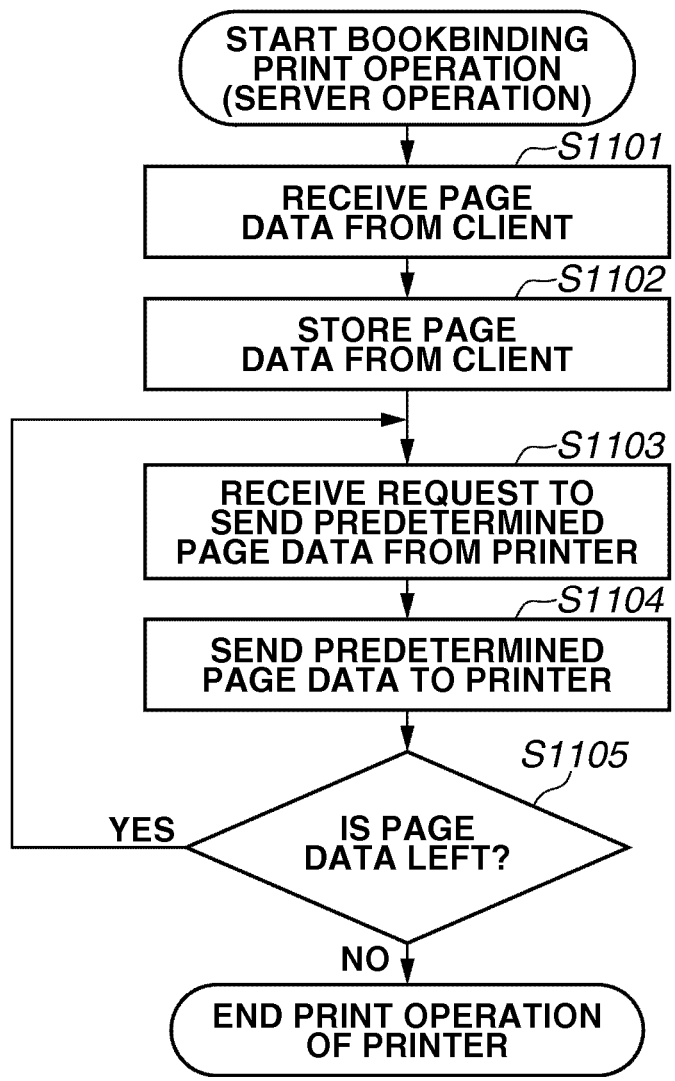
FIG. 13 is a flow chart illustrating an example of printing control processing of a server application according to the first exemplary embodiment.

FIG. 13 is a flow chart illustrating an example of printing control processing of the server application according to the present exemplary embodiment.

In step S1101, the server application 501 receives the data sent from the client computer 101.

In step S1102, the server application 501 stores the data received from the client computer 101 in the storage device 33 in the server 104. As described in also FIG. 11, the client computer 101 generates and sends the drawing data which can be analyzed by the page analyzing unit 512 of the server application 501, and the control data for controlling the drawing data. Furthermore, as described referring to FIG. 12, the printing apparatus receives the control data sent from the client computer 101, and sends a request to send the page data to the server application 501.

In step S1103, the server application 501 receives a page data sending request from the printing apparatus.

In step S1104, the server application 501 analyzes the request content of the page data sending request, and sequentially sends the required page data to the printing apparatus as a sending request source.

In step S1105, the server application 501 confirms whether the page data to be sent is left. When the page data is left (YES in step S1105), the server application 501 repeats the processing from step S1103. When the page data is not left (NO in step S1105), the server application 501 ends the operation of the processing illustrated in FIG. 13.

Figure 14:
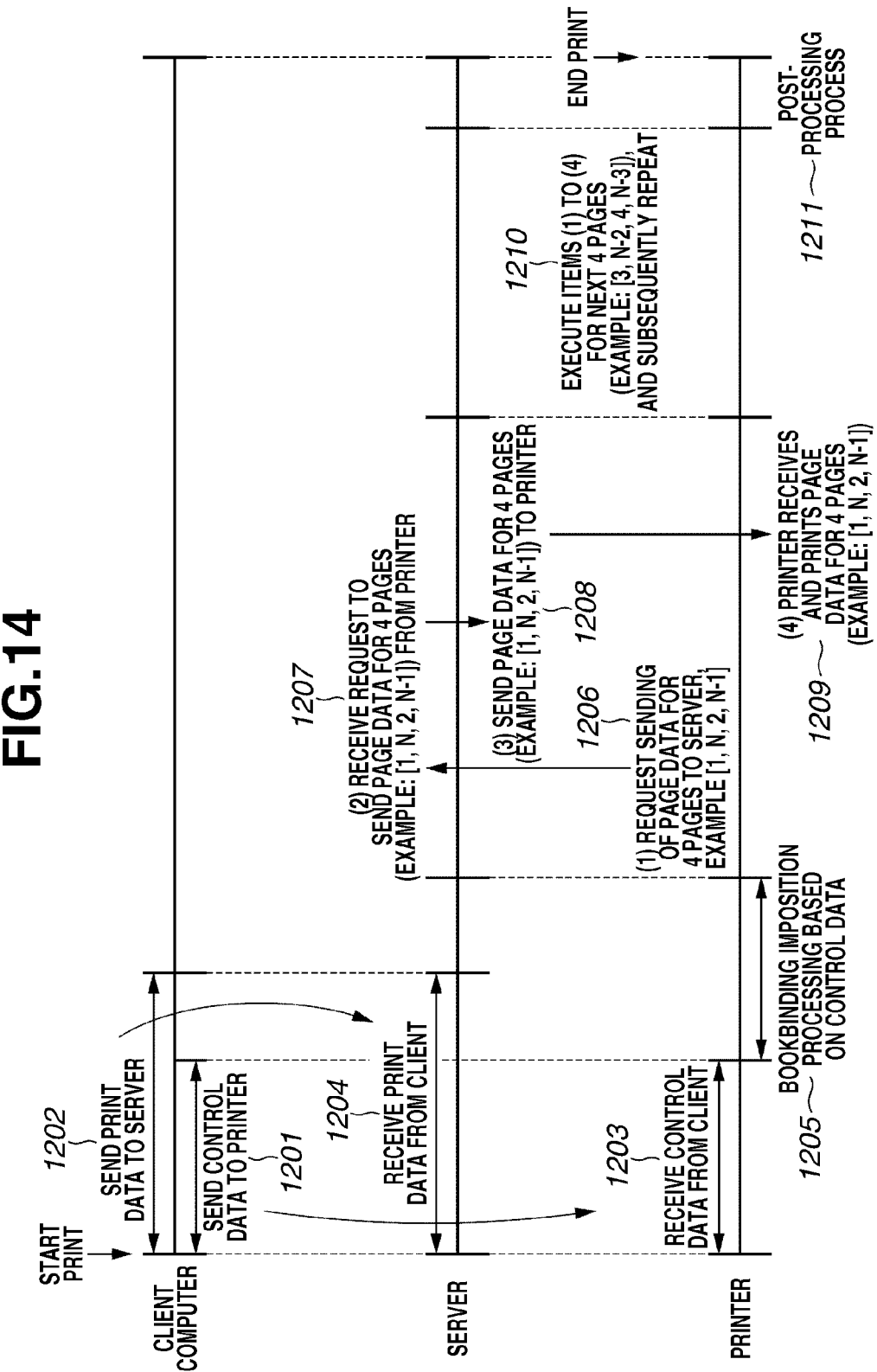
FIG. 14 time-sequentially expresses processing sequences of a client computer, a printing apparatus, and a server according to the first exemplary embodiment.

FIG. 14 time-sequentially expresses processing sequences of the client computer, the printing apparatus, and the server in the present exemplary embodiment.

The left end is a time point at which the client computer 101 starts the print operation. First, in step 1201, the printing apparatus driver sends the print data to the server 104 (steps S901 to S905 of FIG. 11 are completed up to the time point). At the same time, in step 1202, the printing apparatus driver sends the control data to the printing apparatus (step S906 of FIG. 11).

In step 1203, the printing apparatus receives the control data sent from the client computer 101.

In step 1204, the server application 501 receives the print data sent from the client computer 101 (step S1101 of FIG. 13), and once stores the print data (step S1102 of FIG. 13).

In step 1205, the printing apparatus performs the imposition processing for the bookbinding printing (in the present exemplary embodiment) from the control content of the control data received by the printing apparatus (step S1002 of FIG. 12).

Because a page first printed from the result of the imposition processing of step 1205 is determined in step 1206, the printing apparatus requests the drawing data for the required page to the server application 501 (step S1003 of FIG. 12).

In step 1207, the server application 501 receives the request to send the page data sent from the printing apparatus in step 1206 (step S1103 of FIG. 13).

In step 1208, the server application 501 sends the requested page data to the printing apparatus (step S1104 of FIG. 13). That is, the printing apparatus acquires the requested page data.

In step 1209, the printing apparatus performs the print operation of the page data sent from the server (step S1004 of FIG. 12).

Hereinafter, in step 1210, the printing apparatus performs monitoring until the printing is ended (step S1005 of FIG. 12, step S1105 of FIG. 13).

In the last step 1211, the printing apparatus performs post-processing such as saddle-stitching processing and cutting processing (step S1007 of FIG. 12) to complete the processing flow of a series of bookbinding printings.

Figure 15:
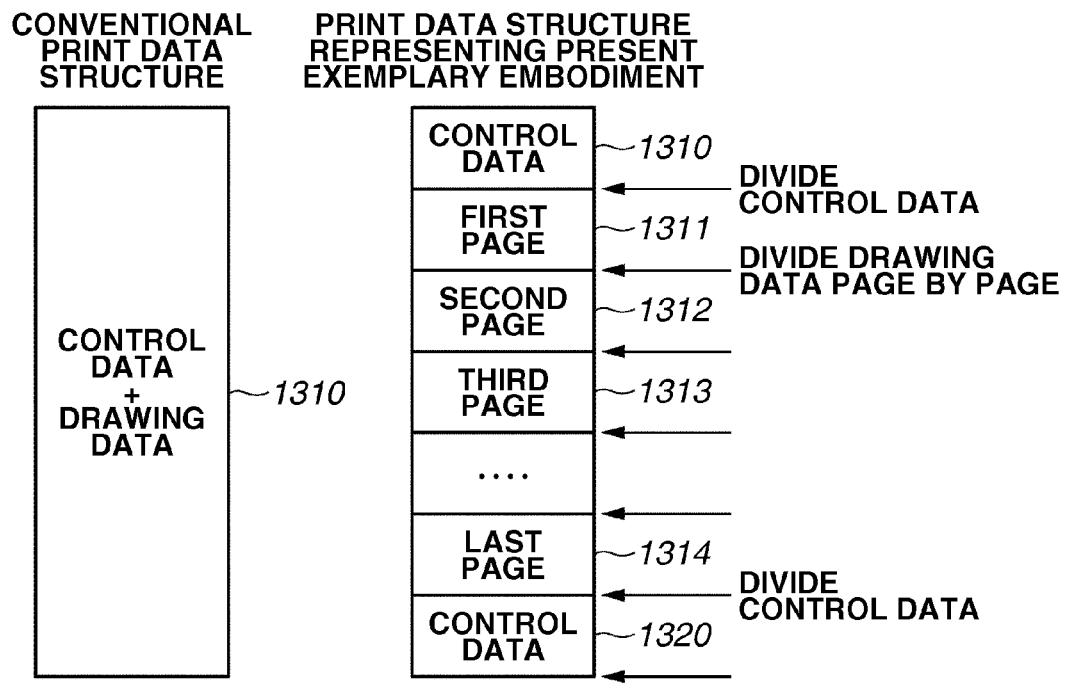
FIG. 15 illustrates a difference between a data structure of print data issued by a client computer in conventional bookbinding printing and that in bookbinding printing according to the first exemplary embodiment.

FIG. 15 illustrates a difference between the data structure of the print data issued by the client computer in an example of conventional bookbinding printing and that in an example representing the present exemplary embodiment. In the conventional data structure 1301, the print data includes control data for instructing output control of a job and drawing data represented by a printer language for instructing drawing. Particularly, the data structure does not clearly divide these data.

On the other hand, in the present exemplary embodiment, it is necessary to clearly divide the control data 1310 and 1320 to be sent to both the server and the printing apparatus from the page data 1311 to 1314 which are the drawing data for each page represented by the printer language for instructing the drawing.

Because it is necessary to distinguish the control data from the page data for each page in the server application 501, processing for dividing the drawing data for each page is also required. Although the description is given in such a manner that the control data is included in the start and end of the print data in FIG. 15, the control data may be included in front of the drawing data of each page in order to describe the feature of each page.

Figure 16:
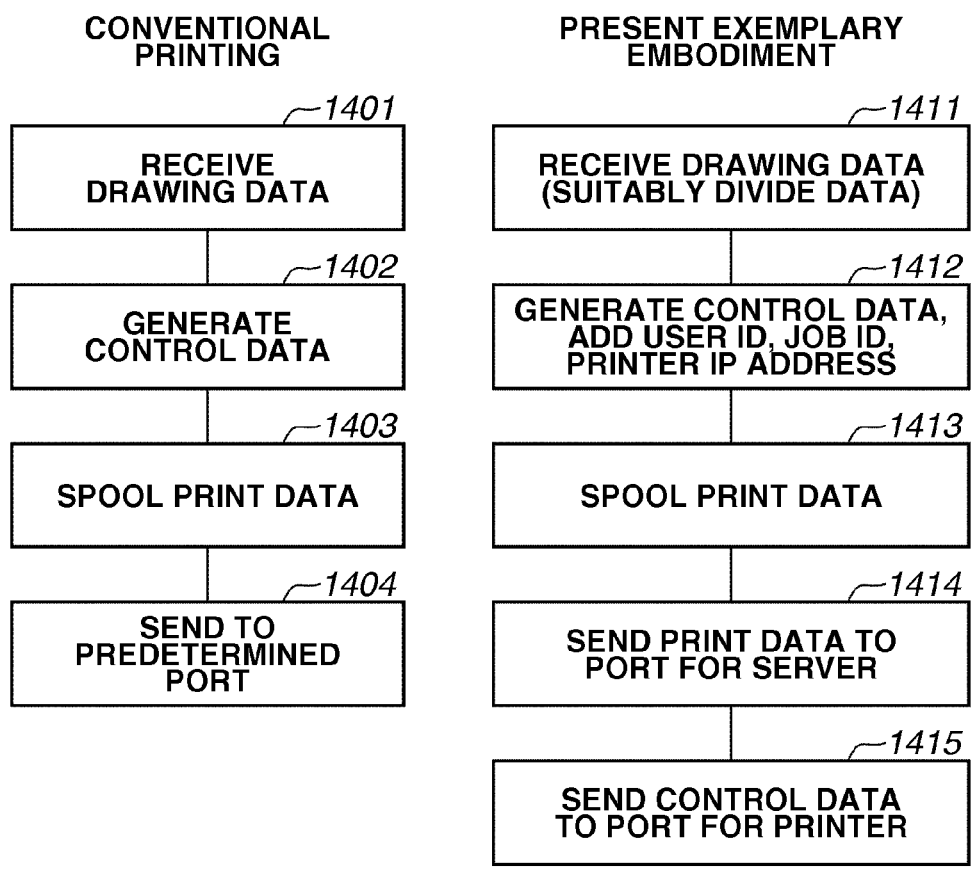
FIG. 16 illustrates a difference between a behavior of a printer driver in the conventional bookbinding printing and that in the bookbinding printing according to the first exemplary embodiment.

FIG. 16 illustrates a difference between the behavior of the printer driver according to the example of the conventional bookbinding printing and that in the example representing the present exemplary embodiment. Conventionally, in step 1401, the printer driver receives the drawing data from the pass-through application. In step 1402, the printer driver generates the control data based on the setting value. In step 1403, the printer driver spools the control data to the spooler. In step 1404, the printer driver sends the control data to the designated print port.

On the other hand, in the present exemplary embodiment, in step 1411, the printer driver receives the drawing data by packet from the pass-through application, and suitably divides the drawing data page by page.

In step 1412, the printer driver generates the control data based on the setting value. Particularly, the printer driver prepares the control data to which information required to discriminate a specific job from the printing apparatus is added.

Examples of the information required to discriminate the specific job from the printing apparatus include a user ID for discriminating the user, a job ID for specifying the job, and an ID address of the printing apparatus for specifying a sending destination from the server in FIG. 16. In step 1413, the printer driver spools the print data for the user ID, the job ID, and the ID address to the spooler of the client computer.

In step 1414, the printer driver sends the print data to a port designated as a port for the server. In step 1415, the printer driver sends the control data to a port designated as a port for the printing apparatus.

The printer driver divides the page based on an issue timing of a function (a StartPage function and an EndPage function in Windows) issued to the printer driver during printing by an operation system operating in the client computer.

FIG. 17 illustrates an example of a print setting screen 2001 displayed by the printer driver according to the present exemplary embodiment. In "an output method" of the print setting screen 2001, the user can select "a server print mode" 2011. [Description of Divided Printing in Conventional Example and Second Exemplary Embodiment]

Figure 18:
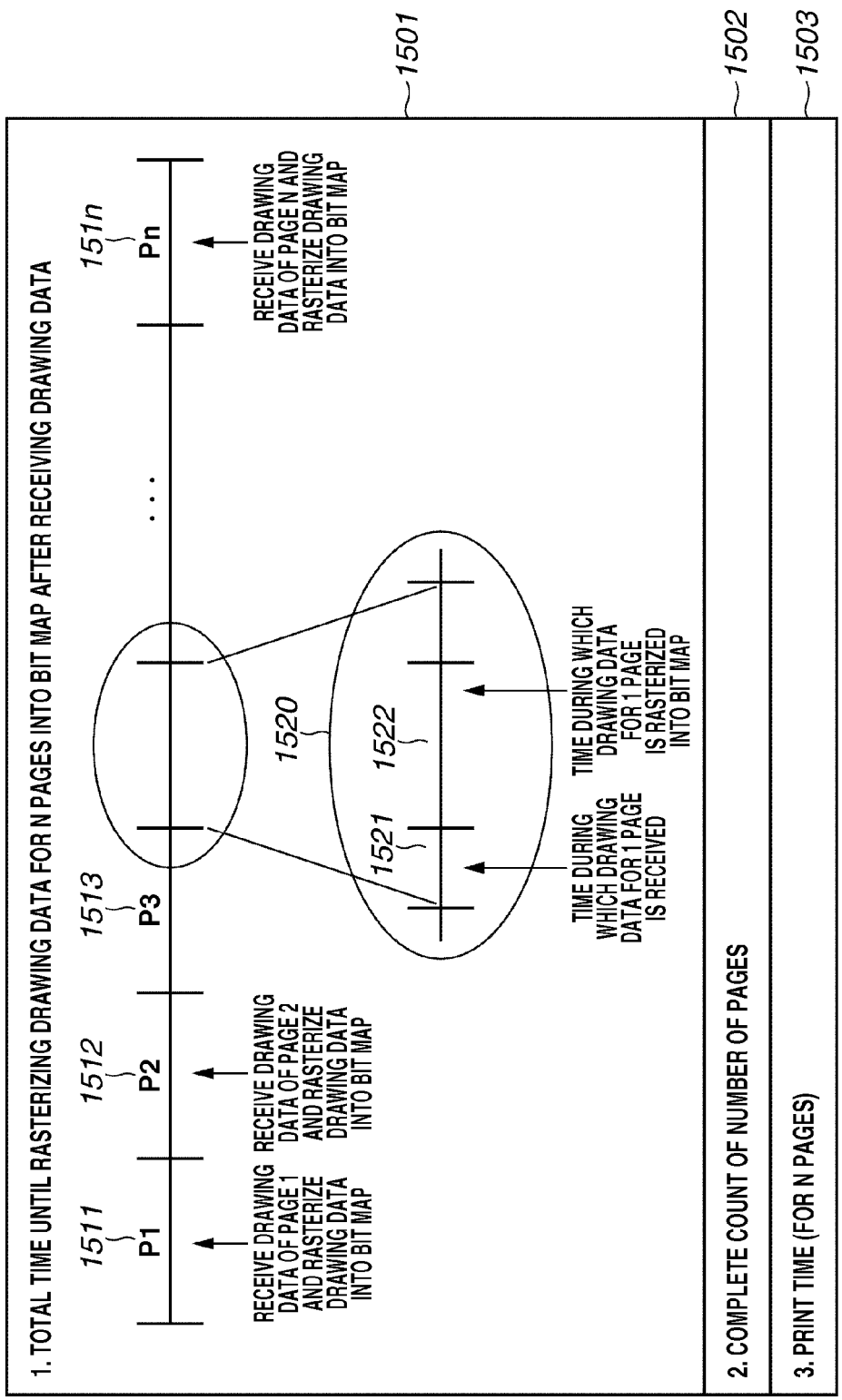
FIG. 18 illustrates a content of an operation in the printing apparatus in the conventional technique when divided print processing is performed.

Hereinafter, points different from those of the first exemplary embodiment will be mainly described. A printer driver provides a printing method for separately designating a paper feeding stage and a paper type of a specific page such as "a first page, a last page, or other pages" (hereinafter, referred to as divided printing). FIG. 18 illustrates a content of an operation in a printing apparatus in a conventional technique when divided print processing is performed.

The printing apparatus receives drawing data of the first page to the last page ("$n^{th}$ page" in FIG. 9) for each page from the printer driver. The printing apparatus rasterizes the drawing data into a data format which can be processed by a printer engine such as a bit map, and once stores the data in a storage device such as a hard disk.

An operation 1501 represents an operation until bit map rasterization is completed from the reception of the drawing data. Processing times 1511 and 1512 represent processing times in page units. A time 1521 in an ellipse 1520 represents a time during which the drawing data for one page is received. A time 1522 represents a time during which the drawing data for one 1 page is rasterized into the drawing data. When the printing apparatus performs the divided printing, the printing apparatus cannot specify the page number of the last page until the total number of pages (n) of the drawing data sent from the printer driver is known.

On the other hand, the printer driver cannot specify a timing at which the application ends all drawing commands. Therefore, the printer driver does not have means for notifying the page number of the last page to the printing apparatus during the pass-through printing. The printing apparatus completes the operation 1501, and then completes the counting of the total number of pages of the print data in an operation 1502. Finally, the printing apparatus completes the drawing processing in an operation 1503.

Figure 19:
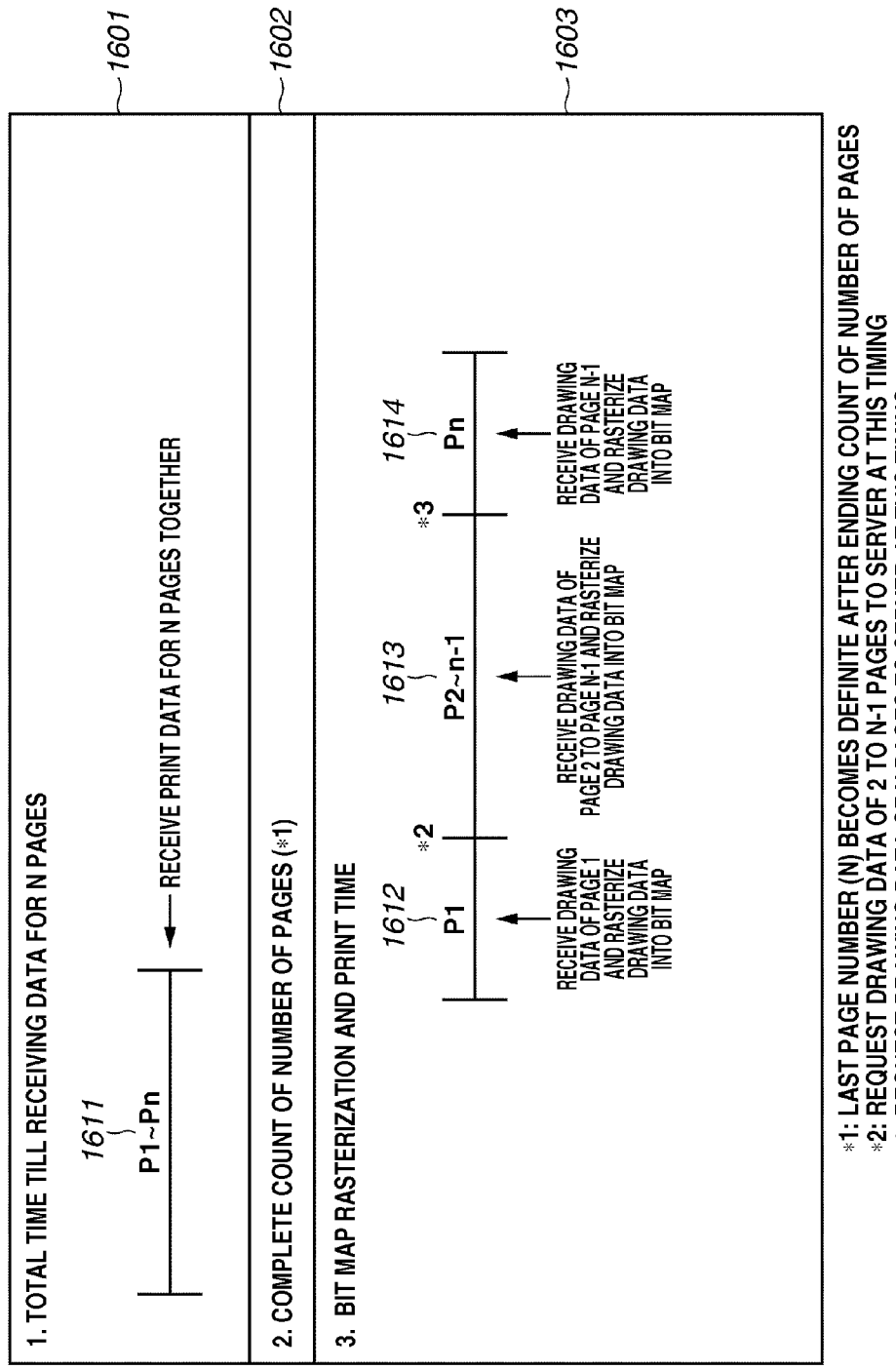
FIG. 19 illustrates a content of an operation of a printing apparatus according to a second exemplary embodiment when divided printing is performed.

On the other hand, operation processing of the present exemplary embodiment will be described referring to FIG. 19. FIG. 19 illustrates a content of an operation of the printing apparatus according to the present exemplary embodiment when the divided printing is performed.

The printer driver creates the drawing data using a data structure which can be controlled in page units by a server application, and sends the print data including the drawing data to a server 104 (the server 104 receives in operation 1601. As described above, the printer driver sends only control data to the printing apparatus at the same timing as that of an operation 1601. A time 1611 represents a time during which the drawing data for all the pages are received.

In an operation 1602, the printing apparatus analyzes the control data, and grasps information such as a size of a paper used for printing and a processing method ("divided printing" in the present exemplary embodiment). Because the reception of the control data for all the pages from the printer driver is finished, the printing apparatus can grasp the total number of pages (n) at this time point.

Because bit map processing in the printing apparatus is not yet conducted up to this time point, only a time during which the server receives the drawing data and the control data for all the pages and a time during which the printing apparatus receives the control data are taken. The printing apparatus executes the count processing of the number of pages for the divided printing.

In an operation 1603, the printing apparatus sends a request to send the page data of the first page, the pages of from the second page to the page previous to the last page, and the last page to the server 104, and rasterizes the page data into a bit map for each page after reception, and executes print processing also including the selection of the paper feeding stage.

This can realize the divided printing which is impossible by the pass-through printing when the printer driver directly sends the print data to the printing apparatus. FIG. 19 illustrates a first page 1612, pages 1613 of from a second page to a page previous to a last page 1614, and a last page 1614 are represented.

The printing control processing of the printer driver according to the present exemplary embodiment is similar to that of the first exemplary embodiment illustrated in FIG. 11. Because the printing control processing of the server application is also similar to that of the first exemplary embodiment illustrated in FIG. 13, the description of the operation is omitted herein.

Figure 20:
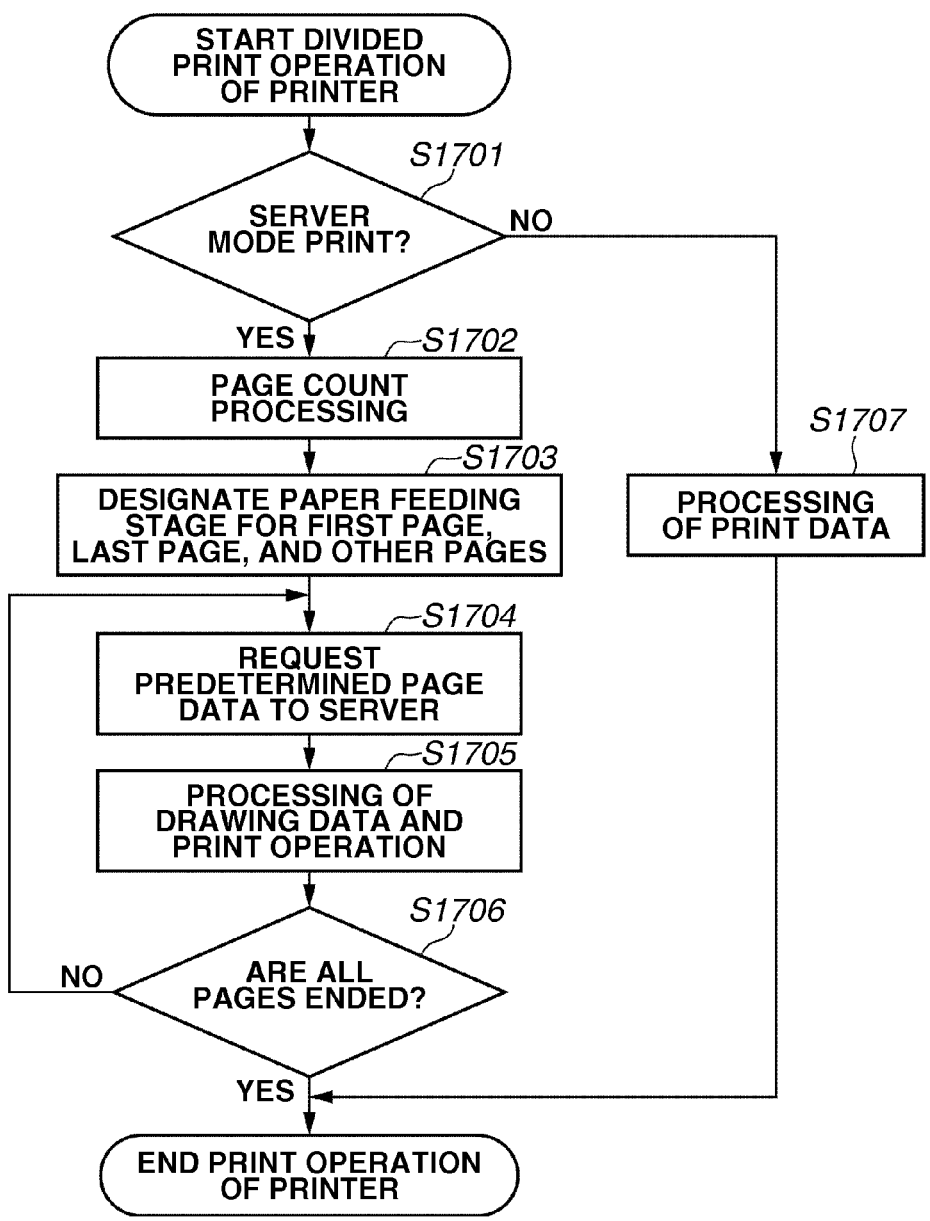
FIG. 20 is a flow chart illustrating an example of printing control processing of a printing apparatus according to the second exemplary embodiment.

FIG. 20 is a flow chart illustrating an example of printing control processing of the printing apparatus according to the present exemplary embodiment. Hereinafter, description will be given using a printing apparatus 102 as an example of the printing apparatus.

In step S1701, the printing apparatus 102 determines whether data sent from a client computer 101 is "a general print mode" or "a print mode via a server" based on the control data. When the printing apparatus 102 determines that the data is "the print mode via a server" (YES in step S1701), the processing proceeds to step S1702. When the printing apparatus 102 determines that the data is "the general print mode" (NO in step S1701), the processing proceeds to step S1707.

In step S1702, the printing apparatus 102 reads a control data portion (only the control data in the present exemplary embodiment) from the data. After the printing apparatus 102 receives all the control data, the printing apparatus 102 performs count processing of the total number of pages (page count in FIG. 20).

After the printing apparatus 102 ends the count processing, in step S1703, the printing apparatus 102 executes paper feeding stage selecting processing for selecting a paper feeding stage from which each page is fed.

In step S1704, the printing apparatus 102 notifies a request to cause the server 104 to send page data required for printing.

In step S1705, the printing apparatus 102 receives the required page data, rasterizes the page data into the drawing data, and executes printing.

In step S1706, the printing apparatus 102 determines whether print processing of all the pages is completed. When the print processing is not ended (NO in step S1706), the printing apparatus 102 repeats steps S1704 and S1705 based on the information of the paper feeding stage associated with each page in step S1703.

On the other hand, in step S1707, the printing apparatus 102 performs processing of the print data of the conventional divided printing as illustrated in FIG. 19.

Figure 21:
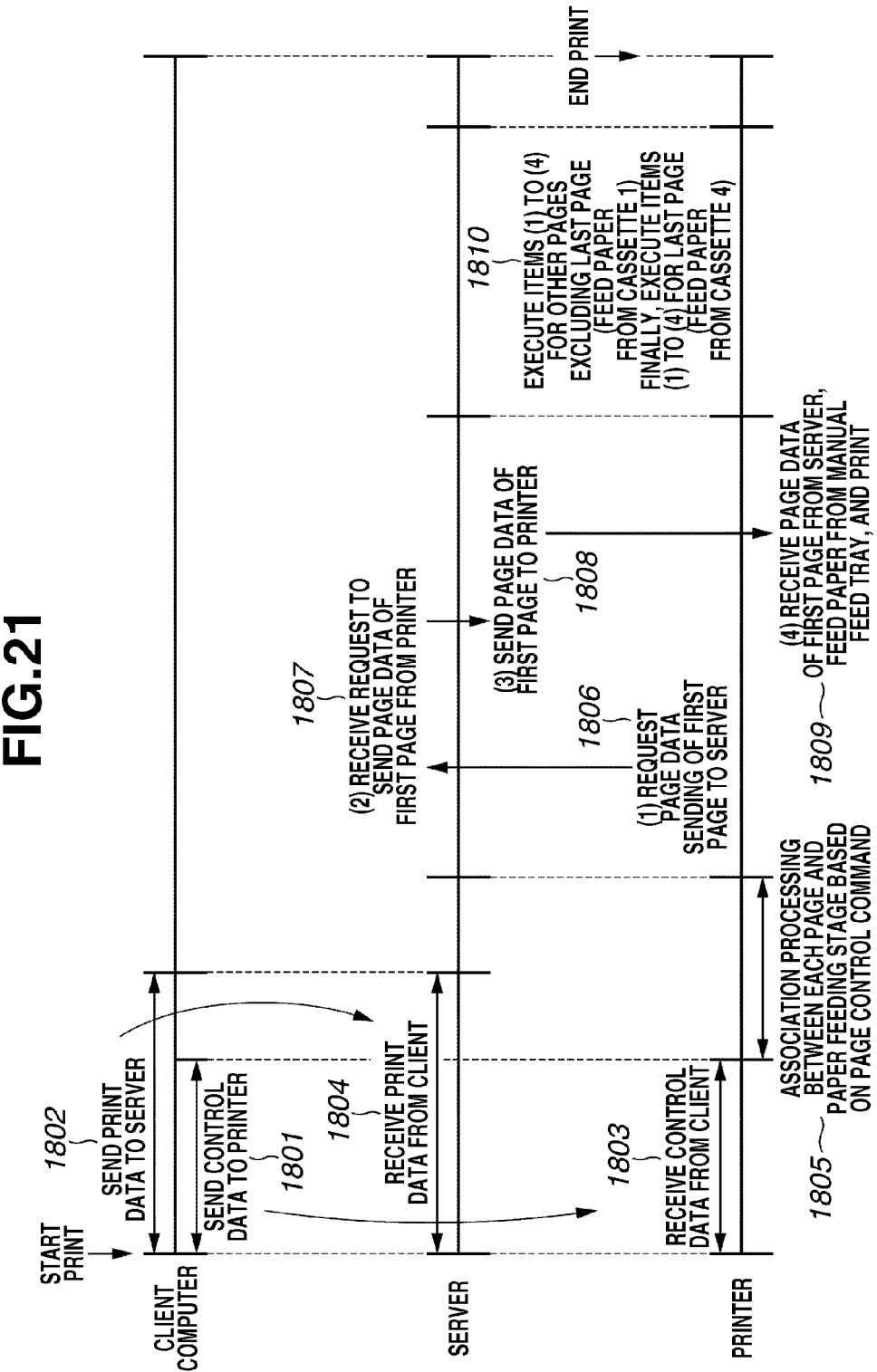
FIG. 21 time-sequentially expresses processing sequences of a client computer, a printing apparatus, and a server according to the second exemplary embodiment.

FIG. 21 time-sequentially expresses processing sequences of a client computer, a printing apparatus, and a server according to the present exemplary embodiment. Herein, a case where the first page is manually fed, the last page is fed from a cassette 4, and the other page is from a cassette 1 is illustrated as an example. The paper to be fed is an example of a medium.

A left end is a time point at which the client computer 101 starts the print operation. First, in step 1801, the printer driver sends the print data to the server 104 (steps S901 to S905 of FIG. 11 are completed up to the time point). At the same time, in step 1802, the printer driver sends a control command to the printing apparatus (step S906 of FIG. 11).

In step 1803, the printing apparatus receives the control data sent from the client computer 101.

In step 1804, the server application 501 receives the print data sent from the client computer 101 (step S1101 of FIG. 13), and once stores the print data (step S1102 of FIG. 13).

In step 1805, the printing apparatus performs page count processing (step S1702 of FIG. 20) for the divided printing and association processing (step S1703 of FIG. 20) of each page and the paper feeding stage (in the present exemplary embodiment) from the control content of the control data received by the printing apparatus.

In step 1806, since the paper feeding stage for feeding each page from the result of the association processing of each page and the paper feeding stage in step 1803 is determined, the printing apparatus requests the drawing data for each required page to the server application 501 (step S1704 of FIG. 20).

In step 1807, the server application 501 receives the request to send the page data sent from the printing apparatus in step 1806 (step S1103 of FIG. 13).

In step 1808, the server application 501 sends the requested page data to the printing apparatus (step S1104 of FIG. 13).

In step 1809, the printing apparatus performs the print operation of the received page data (step S1705 of FIG. 20).

Hereinafter, in step 1810, the printing apparatus performs monitoring until the printing is ended (step S1706 of FIG. 20, step S1105 of FIG. 13) to complete the processing flow of a series of divided printings.

A difference between the data structure of the print data issued by the printer driver in the example of the conventional divided printing and that in the example representing the present exemplary embodiment is the same as that of FIG. 15 described in the first exemplary embodiment.

A difference between the behavior of the printer driver in the example of the conventional divided printing and that in the example representing the present exemplary embodiment is the same as that of FIG. 16 described in the first exemplary embodiment.

The printer driver divides the page based on an issue timing of a function (a StartPage function and an EndPage function in Windows) issued to the printer driver during printing by an operation system operating in the client computer.

Figure 22:
FIG. 22 illustrates an example of a print setting screen displayed by a printer driver according to the second exemplary embodiment.

FIG. 22 illustrates an example of a print setting screen 1901 displayed by the printer driver according to the present exemplary embodiment. When "designate and print first and last papers" 1911 is selected as "a paper feeding method" in the print setting screen 1901, "manual" 1912 is selected as the paper feeding stage of "the first page". A case where "the cassette 1" is selected as the paper feeding stage of "other page" 1913 and "the cassette 4" is selected as "a last page" 1914 are illustrated.

Although each page is described in association with "the paper feeding stage" in the present exemplary embodiment, the association may be with "the paper type". Although "the paper feeding method" is described in a case where "designate and print the first and last papers" is selected, the division may not be limited thereto.

The present invention is realized also by executing the following processing. Specifically, software (program) realizing the function of the above-described exemplary embodiment is supplied to the system or the device via the network or various storage media, and the computer (or the CPU and the MPU) of the system or the device reads and executes the program.

As described above, the above-described exemplary embodiments can reduce the memory amount used in the printing apparatus and shorten the time required for printing.

That is, the exemplary embodiments can shorten the time until the printing is started and the time until the printing is ended in the bookbinding printing. Further, since it is not necessary to provide all the data for the total pages in the memory, the exemplary embodiments can perform the bookbinding printing also in the saved memory type printing apparatus. The exemplary embodiments can perform the printing by switching the paper feeding stages and the paper sizes.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-006451 filed Jan. 16, 2012, which is hereby incorporated by reference herein in its entirety.

What is claimed is:

1. An information processing apparatus comprising:
   a determination unit configured to determine whether a print mode is a print mode via a server capable of performing communication via a network; and
   a printing control unit configured to send print data including drawing data received from a pass-through application and divided in page units and control data regarding printing of the drawing data to the server when the determination unit determines that the print mode is the print mode via the server, and to send the control data to a printing apparatus capable of performing communication via the network.

2. The information processing apparatus according to claim 1, wherein the printing control unit sends the print data including the drawing data received from the pass-through application and the control data regarding the printing of the drawing data to the printing apparatus when the determination unit determines that the print mode is not the print mode via the server.

3. The information processing apparatus according to claim 1, wherein the determination unit determines whether the print mode is the print mode via the server capable of performing communication via the network based on an output method selected on a print setting screen.

4. A printing apparatus comprising:
   a determination unit configured to determine whether a print mode is a print mode via a server capable of performing communication via a network;
   a bookbinding imposition processing unit configured to execute bookbinding imposition processing based on control data regarding printing of drawing data received from an information processing apparatus capable of performing communication via the network when the determination unit determines that the print mode is the print mode via the server;
   an acquisition unit configured to acquire drawing data of the designated number of pages from the server based on the control data after the processing by the bookbinding imposition processing unit is ended;
   a rasterizing unit configured to rasterize the drawing data of the number of pages acquired by the acquisition unit into data of a set data format;
   a print unit configured to print the data of the data format rasterized by the rasterizing unit; and
   a control unit configured to perform control so that the acquisition unit acquires drawing data of a next designated number of pages from the server when the rasterizing unit rasterizes the drawing data acquired by the acquisition unit into the data of the set data format in a case where processing for all the pages is not ended.

5. A printing apparatus comprising:
   a determination unit configured to determine whether a print mode is a print mode via a server capable of performing communication via a network;
   a counting unit configured to count the total number of pages based on control data regarding printing of drawing data received from an information processing apparatus capable of performing communication via the network when the determination unit determines that the print mode is the print mode via the server;
   a selecting unit configured to select a paper feeding stage from which each page is fed based on the control data after the processing of the counting unit is ended and to associate each page with the selected paper feeding stage;
   an acquisition unit configured to acquire the drawing data of the page associated with the paper feeding stage by the selecting unit from the server;
   a rasterizing unit configured to rasterize the drawing data acquired by the acquisition unit into data of a set data format;
   a print unit configured to print the data of the data format rasterized by the rasterizing unit on a medium fed from the paper feeding stage associated with the page of the drawing data acquired by the acquisition unit; and
   a control unit configured to perform control so that the acquisition unit acquires drawing data of a page associated with a next paper feeding stage from the server when the rasterizing unit rasterizes the drawing data acquired by the acquisition unit into the data of the set data format in a case where processing for all the pages is not ended.

6. A printing apparatus comprising:
   a determination unit configured to determine whether a print mode is a print mode via a server capable of performing communication via a network;
   a counting unit configured to count the total number of pages based on control data regarding printing of drawing data received from an information processing apparatus capable of performing communication via the network when the determination unit determines that the print mode is the print mode via the server;
   a selecting unit configured to select a paper type with which each page is printed based on the control data after the processing by the counting unit is ended and to associate each page with the selected paper type;
   an acquisition unit configured to acquire the drawing data of the page associated with the paper type by the selecting unit from the server;
   a rasterizing unit configured to rasterize the drawing data acquired by the acquisition unit into data of a set data format;
   a print unit configured to print the data of the data format rasterized by the rasterizing unit; and
   a control unit configured to perform control so that the acquisition unit acquires drawing data of a page associated with a next paper type of the paper type from the server when the rasterizing unit rasterizes the drawing data acquired by the acquisition unit into the data of the set data format in a case where processing for all the pages is not ended.

7. A printing system comprising:
   an information processing apparatus; and
   a printing apparatus capable of communicating with the information processing apparatus via a network, wherein the information processing apparatus comprises:

a determination unit configured to determine whether a print mode is a print mode via a server capable of performing communication via the network; and a printing control unit configured to send print data including drawing data received from a pass-through application and divided page by page and control data regarding printing of the drawing data to the server when the determination unit determines that the print mode is the print mode via the server and to send the control data to the printing apparatus, and wherein the printing apparatus comprises:

a determination unit configured to determine whether the print mode is a print mode via the server;

an imposition processing unit configured to count the total number of pages and to execute imposition processing based on the control data regarding the printing of the drawing data received from the information processing apparatus when the determination unit determines that the print mode is the print mode via the server;

an acquisition unit configured to acquire drawing data of the set number of pages from the server based on the control data after the processing by the imposition processing unit is ended;

a rasterizing unit configured to rasterize the drawing data acquired by the acquisition unit into data of a set data format;

a print unit configured to print the data of the data format rasterized by the rasterizing unit; and a control unit configured to perform control so that the acquisition unit acquires drawing data of a next set number of pages from the server when the rasterizing unit rasterizes the drawing data acquired by the acquisition unit into the data of the set data format in a case where processing for all the pages is not ended.

8. A printing system comprising:

an information processing apparatus; and a printing apparatus capable of communicating with the information processing apparatus via a network, wherein the information processing apparatus comprises:

a determination unit configured to determine whether a print mode is a print mode via a server device capable of performing communication via the network; and a printing control unit configured to send print data including drawing data received from a pass-through application and divided page by page and control data regarding printing of the drawing data to the server when the determination unit determines that the print mode is a print mode via the server and to send the control data to the printing apparatus, and wherein the printing apparatus comprises:

a determination unit configured to determine whether the print mode is a print mode via the server device;

a counting unit configured to count the total number of pages based on the control data regarding the printing of the drawing data received from an information processing apparatus when the determination unit determines that the print mode is the print mode via the server;

a selecting unit configured to select a paper feeding stage from which each page is fed based on the control data after the processing of the counting unit is ended and to associate each page with the selected paper feeding stage;

an acquisition unit configured to acquire drawing data of a page associated with the paper feeding stage by the selecting unit from the server;

a rasterizing unit configured to rasterize the drawing data acquired by the acquisition unit into data of a set data format;

a print unit configured to print the data of the data format rasterized by the rasterizing unit;

a print unit configured to print the data of the data format rasterized by the rasterizing unit on a medium fed from the paper feeding stage associated with the page of the drawing data acquired by the acquisition unit; and a control unit configured to perform control so that the acquisition unit acquires drawing data of a page associated with a next paper feeding stage from the server device when the rasterizing unit rasterizes the drawing data acquired by the acquisition unit into the data of the set data format in a case where processing for all the pages is not ended.

9. A printing system comprising:

an information processing apparatus; and a printing apparatus capable of communicating with the information processing apparatus via a network, wherein the information processing apparatus comprises:

a determination unit configured to determine whether a print mode is a print mode via a server capable of performing communication via the network; and a printing control unit configured to send print data including drawing data received from a pass-through application and divided page by page and control data regarding printing of the drawing data to the server when the determination unit determines that the print mode is the print mode via the server and to send the control data to the printing apparatus, and wherein the printing apparatus comprises:

a determination unit configured to determine whether the print mode is the print mode via the server device capable of performing communication via the network;

a counting unit configured to count the total number of pages based on the control data regarding the printing of the drawing data received from the information processing apparatus when the determination unit determines that the print mode is the print mode via the server;

a selecting unit configured to select a paper type with which each page is printed based on the control data after the processing of the counting unit is ended and to associate each page with the selected paper type;

an acquisition unit configured to acquire the drawing data of the page associated with the paper type by the selecting unit from the server device;

a rasterizing unit configured to rasterize the drawing data acquired by the acquisition unit into data of a set data format;

a print unit configured to print the data of the data format rasterized by the rasterizing unit; and a control unit configured to perform control so that the acquisition unit acquires drawing data of a page associated with a next paper type of the paper type from the server when the rasterizing unit rasterizes the drawing data acquired by the acquisition unit into the data of the set data format in a case where processing for all the pages is not ended.

10. A printing control method executed by an information processing apparatus, the method comprising:

determining whether a print mode is a print mode via a server device capable of performing communication via a network; and sending print data including drawing data received from a pass-through application and divided page by page and control data regarding printing of the drawing data to the server device when it is determined that the print mode is the print mode via the server device and sending the control data to a printing apparatus capable of performing communication via the network.

11. A printing control method executed by a printing apparatus, the method comprising the steps of:
determining whether a print mode is a print mode via a server device capable of performing communication via a network;
executing bookbinding imposition processing based on control data regarding printing of drawing data received from an information processing apparatus capable of performing communication via the network when it is determined that the print mode is a print mode via the server;
acquiring drawing data of the designated number of pages from the server based on the control data after the processing of the bookbinding imposition processing is ended;
rasterizing the acquired drawing data of the number of pages into data of a set data format;
printing the rasterized data of the data format; and
performing control so that the drawing data of a next designated number of pages is acquired from the server when the acquired drawing data is rasterized into the data of the set data format in a case where processing for all the pages is not ended.

12. A printing control method executed by a printing apparatus, the method comprising:
determining whether a print mode is a print mode via a server capable of performing communication via a network;
counting the total number of pages based on control data regarding printing of drawing data received from an information processing apparatus capable of performing communication via the network when it is determined that the print mode is the print mode via the server;
selecting a paper feeding stage from which each page is fed based on the control data after the counting is ended and associating each page with the selected paper feeding stage;
acquiring the drawing data of the page having associated with the paper feeding stage from the server;
rasterizing the acquired drawing data into data of a set data format;
printing the rasterized data of the data format on a medium fed from the paper feeding stage associated with the acquired page of the drawing data; and
performing control so that the acquiring step acquires drawing data of a page associated with a next paper feeding stage from the server device when the acquired drawing data is rasterized into the data of the set data format in a case where processing for all the pages is not ended.

13. A printing control method executed by a printing apparatus, the method comprising:
determining whether a print mode is a print mode via a server capable of performing communication via a network;
counting the total number of pages based on control data regarding printing of drawing data received from an information processing apparatus capable of performing communication via the network when it is determined that the print mode is the print mode via the server;
selecting a paper type with which each page is printed based on the control data after the counting is ended and associating each page with the selected paper type;
acquiring the drawing data of the page having associated with the paper type from the server device;
rasterizing the acquired drawing data into data of a set data format;
printing the rasterized data of the data format; and
performing control so that the drawing data of a page associated with a next paper type of the paper type from the server is acquired when the acquired drawing data rasterized into the data of the set data format in a case where processing for all the pages is not ended.

14. A printing control method for a printing system including an information processing apparatus and a printing apparatus capable of communicating with the information processing apparatus via a network, the method comprising:
determining, by the information processing apparatus, whether a print mode is a print mode via a server capable of performing communication via the network;
sending, by the information processing apparatus, print data including drawing data received from a pass-through application and divided page by page and control data regarding printing of the drawing data to the server device when it is determined that the print mode is the print mode via the server and sending the control data to the printing apparatus,
determining, by the printing apparatus, whether the print mode is the print mode via the server;
counting, by the printing apparatus, the total number of pages and executing imposition processing based on the control data regarding the printing of the drawing data received from the information processing apparatus when it is determined that the print mode is the print mode via the server;
acquiring, by the printing apparatus, drawing data of the set number of pages from the server based on the control data after the imposition is ended;
rasterizing, by the printing apparatus, the acquired drawing data into data of a set data format;
printing, by the printing apparatus, the rasterized data of the data format; and
performing, by the printing apparatus, control so that the drawing data of a next set number of pages from the server is acquired when the acquired drawing data is rasterized into the data of the set data format in a case where processing for all the pages is not ended.

15. A printing control method for a printing system including an information processing apparatus and a printing apparatus capable of communicating with the information processing apparatus via a network, the method comprising:
determining, by the information processing apparatus, whether a print mode is a print mode via a server capable of performing communication via a network;
sending, by the information processing apparatus, print data including drawing data received from a pass-through application and divided page by page and control data regarding printing of the drawing data to the server when it is determined that the print mode is the print mode via the server and sending the control data to the printing apparatus,
determining, by the printing apparatus, whether the print mode is the print mode via the server;
counting, by the printing apparatus, the total number of pages based on the control data regarding the printing of the drawing data received from the information processing apparatus when it is determined that the print mode is the print mode via the server;
selecting, by the printing apparatus, a paper feeding stage from which each page is fed based on the control data after the counting is ended and associating each page with the selected paper feeding stage;

acquiring, by the printing apparatus, drawing data of a page associated with the paper feeding stage from the server;

rasterizing, by the printing apparatus, the acquired drawing data into data of a set data format;

printing, by the printing apparatus, the rasterized data of the data format;

printing, by the printing apparatus, the rasterized data of the data format on a medium fed from the paper feeding stage associated with the page of the drawing data acquired in the acquiring step; and performing, by the printing apparatus, control so that the drawing data of a page associated with a next paper feeding stage is acquired from the server when the acquired drawing data is rasterized into the data of the set data format in a case where processing for all the pages is not ended.

16. A printing control method for a printing system including an information processing apparatus and a printing apparatus capable of communicating with the information processing apparatus via a network, the method comprising:

determining, by the information processing apparatus, whether a print mode is a print mode via a server capable of performing communication via a network;

sending, by the information processing apparatus, print data including drawing data received from a pass-through application and divided page by page and control data regarding printing of the drawing data to the server when it is determined that the print mode is the print mode via the server and sending the control data to the printing apparatus, determining, by the printing apparatus, whether a print mode is the print mode via the server;

counting, by the printing apparatus, the total number of pages based on the control data regarding the printing of the drawing data received from the information processing apparatus when it is determined that the print mode is the print mode via the server;

selecting, by the printing apparatus, a paper type with which each page is printed based on the control data after the counting is ended and associating each page with the selected paper type;

acquiring, by the printing apparatus, the drawing data of the page associated with the paper type from the server;

rasterizing, by the printing apparatus, the acquired drawing data into data of a set data format;

printing, by the printing apparatus, the rasterized data of the data format; and performing, by the printing apparatus, control so that the drawing data of a page associated with a next paper type of the paper type is acquired from the server when the acquired drawing data is rasterized into the data of the set data format in a case where processing for all the pages is not ended.

17. A non-transitory storage medium storing a program for causing a computer to execute a method, the method comprising:

determining whether a print mode is a print mode via a server capable of performing communication via a network; and sending print data including drawing data received from a pass-through application and divided page by page and control data regarding printing of the drawing data to the server when it is determined that that the print mode is the print mode via the server and sending the control data to a printing apparatus capable of performing communication via the network.

18. A non-transitory storage medium storing a program for causing a computer to execute a method, the method comprising:

determining whether a print mode is a print mode via a server capable of performing communication via a network;

executing bookbinding imposition processing based on control data regarding printing of drawing data received from an information processing apparatus capable of performing communication via the network when it is determined that the print mode is the print mode via the server;

acquiring drawing data of the designated number of pages from the server based on the control data after the bookbinding imposition processing is ended;

rasterizing the acquired drawing data of the number of pages into data of a set data format;

printing the rasterized data of the data format; and performing control so that the drawing data of a next designated number of pages is acquired from the server when the acquired drawing data is rasterized into the data of the set data format in a case where processing for all the pages is not ended.

19. A non-transitory storage medium storing a program for causing a computer to execute a method, the method comprising:

determining whether a print mode is a print mode via a server capable of performing communication via a network;

counting the total number of pages based on control data regarding printing of drawing data received from an information processing apparatus capable of performing communication via the network when it is determined that the print mode is the print mode via the server;

selecting a paper feeding stage from which each page is fed based on the control data after the counting is ended and associating each page with the selected paper feeding stage;

acquiring the drawing data of the page having associated with the paper feeding stage from the server;

rasterizing the acquired drawing data into data of a set data format;

printing the rasterized data of the data format on a medium fed from the paper feeding stage associated with the page of the acquired drawing data; and performing control so that the drawing data of a page associated with a next paper feeding stage is acquired from the server when the acquired drawing data is rasterized into the data of the set data format in a case where processing for all the pages is not ended.

20. A non-transitory storage medium storing a program for causing a computer to execute a method, the method comprising:

determining whether a print mode is a print mode via a server capable of performing communication via a network;

counting the total number of pages based on control data regarding printing of drawing data received from an information processing apparatus capable of performing communication via the network when it is determined that the print mode is the print mode via the server;

selecting a paper type with which each page is printed based on the control data after the counting is ended and associating each page with the selected paper type;

acquiring the drawing data of the page having associated with the paper type from the server;
rasterizing the acquired drawing data into data of a set data format;
printing the rasterized data of the data format; and
performing control so that the drawing data of a page associated with a next paper type of the paper type is acquired from the server when the acquired drawing data is rasterized into the data of the set data format in a case where processing for all the pages is not ended.

* * * * *